(12) United States Patent
Vorbach

(10) Patent No.: US 6,859,869 B1
(45) Date of Patent: Feb. 22, 2005

(54) DATA PROCESSING SYSTEM

(75) Inventor: Martin Vorbach, Karlaruhe (DE)

(73) Assignee: PACT XPP Technologies AG, Munich (DE)

( * ) Notice: Subject to any disclaimer, the term of this patent is extended or adjusted under 35 U.S.C. 154(b) by 0 days.

(21) Appl. No.: 09/290,342

(22) Filed: Apr. 12, 1999

Related U.S. Application Data

(63) Continuation of application No. 08/544,435, filed on Nov. 17, 1995, now Pat. No. 5,943,242.

(51) Int. Cl.$^7$ .............................................. G06F 15/00
(52) U.S. Cl. .............................. 712/10; 712/15; 712/18
(58) Field of Search .............................. 712/10–12, 15, 712/18, 16, 32

(56) References Cited

U.S. PATENT DOCUMENTS

| | | | |
|---|---|---|---|
| 4,591,979 A | 5/1986 | Iwashita | |
| 4,706,216 A | 11/1987 | Carter | |

(List continued on next page.)

FOREIGN PATENT DOCUMENTS

| | | |
|---|---|---|
| DE | 4416881 | 5/1993 |
| EP | 0221360 | 5/1987 |

(List continued on next page.)

FOREIGN PATENT DOCUMENTS

| | | |
|---|---|---|
| EP | 0428327 A1 | 5/1991 |
| EP | 748051 A2 | 12/1991 |
| EP | 0539596 A1 | 5/1993 |
| EP | 0678985 | 10/1995 |
| EP | 0707269 A | 4/1996 |
| EP | 735685 | 10/1996 |
| EP | 0748051 A2 | 12/1996 |
| EP | 0735685 | 10/1998 |
| EP | 726532 | 8/2000 |
| WO | A9004835 | 5/1990 |
| WO | 90/11648 | 10/1990 |
| WO | A9311503 | 6/1993 |
| WO | 94/08399 | 4/1994 |
| WO | 95/00161 | 1/1995 |
| WO | 95/26001 | 9/1995 |

OTHER PUBLICATIONS

Saleeba, Micheal, "A self–contained dynamically reconfigurable processr" Feb. 1993, 16$^{th}$ Australian Computer Science Conference, ASCS–16, QLD, Australia, pp. 59–70.*

Bittner, Ray, A., Jr., Wormhole Run–Time Reconfiguration: Conceptualization and VLSI Design of a High Performance Computing System:, Dissertation, Jan. 23, 1997, pp. i–xx, 1–415.

Athanas, Peter, et al., "IEEE Symposium on FPGAs For Custom Computing Machines," IEE Computer Society Press, Apr. 19–21, 1995 pp. i–vii, 1–222.

(List continued on next page.)

Primary Examiner—Stacy A. Whitmore
(74) Attorney, Agent, or Firm—Kenyon & Kenyon

(57) ABSTRACT

A data processing system, wherein a data flow processor (DFP) integrated circuit chip is provided which comprises a plurality of orthogonally arranged homogeneously structured cells, each cell having a plurality of logically same and structurally identically arranged modules. The cells are combined and facultatively grouped using lines and columns and connected to the input/output ports of the DFP. A compiler programs and configures the cells, each by itself and facultatively-grouped, such that random logic functions and/or linkages among the cells can be realized. The manipulation of the DFP configuration is performed during DFP operation such that modification of function parts (MACROs) of the DFP can take place without requiring other function parts to be deactivated or being impaired.

72 Claims, 13 Drawing Sheets

U.S. PATENT DOCUMENTS

| | | | |
|---|---|---|---|
| 4,720,780 A | * 1/1988 | Dolecek | 712/18 |
| 4,739,474 A | 4/1988 | Holsztynski | |
| 4,761,755 A | 8/1988 | Ardini et al. | |
| 4,811,214 A | 3/1989 | Nosenchuck et al. | |
| 4,852,048 A | 7/1989 | Moton | |
| 4,870,302 A | 9/1989 | Freeman | |
| 4,901,268 A | 2/1990 | Judd | |
| 4,967,340 A | 10/1990 | Dawes | |
| 5,014,193 A | 5/1991 | Garner et al. | |
| 5,015,884 A | 5/1991 | Agrawal et al. | |
| 5,021,947 A | 6/1991 | Campbell et al. | |
| 5,023,775 A | 6/1991 | Poret | |
| 5,043,978 A | 8/1991 | Nagler et al. | |
| 5,081,375 A | 1/1992 | Pickett et al. | |
| 5,109,503 A | 4/1992 | Cruickshank et al. | |
| 5,113,498 A | 5/1992 | Evan et al. | |
| 5,115,510 A | 5/1992 | Okamoto et al. | |
| 5,123,109 A | 6/1992 | Hillis | |
| 5,125,801 A | 6/1992 | Nabity et al. | |
| 5,128,559 A | 7/1992 | Steele | |
| 5,142,469 A | 8/1992 | Weisenborn | |
| 5,204,935 A | 4/1993 | Mihara et al. | |
| 5,208,491 A | 5/1993 | Ebeling et al. | |
| 5,226,122 A | 7/1993 | Thayer et al. | |
| RE34,363 E | 8/1993 | Freeman | |
| 5,233,539 A | 8/1993 | Agrawal et al. | |
| 5,247,689 A | 9/1993 | Ewert | |
| 5,287,472 A | 2/1994 | Horst | |
| 5,301,284 A | * 4/1994 | Estes et al. | 711/203 |
| 5,301,344 A | 4/1994 | Kolchinsky | |
| 5,303,172 A | 4/1994 | Magar et al. | |
| 5,336,950 A | 8/1994 | Popli et al. | |
| 5,347,639 A | * 9/1994 | Rechtschaffen et al. | 712/203 |
| 5,361,373 A | 11/1994 | Gilson | |
| 5,410,723 A | * 4/1995 | Schmidt et al. | 712/18 |
| 5,418,952 A | 5/1995 | Morley et al. | |
| 5,421,019 A | 5/1995 | Holsztynski et al. | |
| 5,422,823 A | 6/1995 | Agrawal et al. | |
| 5,426,378 A | 6/1995 | Ong | |
| 5,430,687 A | 7/1995 | Hung et al. | |
| 5,440,245 A | 8/1995 | Galbraith et al. | |
| 5,440,538 A | 8/1995 | Olsen | |
| 5,442,790 A | 8/1995 | Nosenchuck | |
| 5,444,394 A | 8/1995 | Watson et al. | |
| 5,448,186 A | 9/1995 | Kawata | |
| 5,455,525 A | 10/1995 | Ho et al. | |
| 5,457,644 A | 10/1995 | McCollum | |
| 5,465,375 A | * 11/1995 | Thepaut et al. | 712/15 |
| 5,473,266 A | 12/1995 | Ahanin et al. | |
| 5,473,267 A | 12/1995 | Stansfield | |
| 5,475,583 A | 12/1995 | Bock et al. | |
| 5,475,803 A | 12/1995 | Stearns et al. | |
| 5,475,856 A | * 12/1995 | Kogge | 712/20 |
| 5,483,620 A | 1/1996 | Pechanek et al. | |
| 5,485,103 A | 1/1996 | Pedersen et al. | |
| 5,485,104 A | 1/1996 | Agrawal et al. | |
| 5,489,857 A | 2/1996 | Agrawal et al. | |
| 5,491,353 A | 2/1996 | Kean | |
| 5,493,239 A | 2/1996 | Zlotnick | |
| 5,497,498 A | 3/1996 | Taylor | |
| 5,506,998 A | 4/1996 | Kato et al. | |
| 5,510,730 A | 4/1996 | El Gamal et al. | |
| 5,511,173 A | 4/1996 | Yamaura et al. | |
| 5,513,366 A | 4/1996 | Agarwal et al. | |
| 5,521,837 A | 5/1996 | Frankle et al. | |
| 5,522,083 A | 5/1996 | Gove et al. | |
| 5,532,693 A | 7/1996 | Winters et al. | |
| 5,532,957 A | 7/1996 | Malhi | |
| 5,535,406 A | 7/1996 | Kolchinsky | |
| 5,537,057 A | * 7/1996 | Leong et al. | |
| 5,537,601 A | * 7/1996 | Kimura et al. | |
| 5,541,530 A | * 7/1996 | Cliff et al. | |
| 5,544,336 A | * 8/1996 | Kato et al. | |
| 5,548,773 A | * 8/1996 | Kemeny et al. | |
| 5,555,434 A | * 9/1996 | Carlstedt | |
| 5,559,450 A | * 9/1996 | Ngai et al. | |
| 5,561,738 A | * 10/1996 | Kinerk et al. | |
| 5,570,040 A | * 10/1996 | Lytle et al. | |
| 5,583,450 A | * 12/1996 | Trimberger et al. | |
| 5,586,044 A | * 12/1996 | Agrawal et al. | |
| 5,587,921 A | * 12/1996 | Agrawal et al. | |
| 5,588,152 A | * 12/1996 | Dapp et al. | |
| 5,590,345 A | * 12/1996 | Barker et al. | |
| 5,590,348 A | * 12/1996 | Barker et al. | |
| 5,596,742 A | * 1/1997 | Agarwal et al. | |
| 5,617,547 A | * 4/1997 | Feeney et al. | |
| 5,634,131 A | * 5/1997 | Matter et al. | |
| 5,649,179 A | * 7/1997 | Steenstra et al. | 712/248 |
| 5,652,894 A | * 7/1997 | Hu et al. | |
| 5,655,124 A | * 8/1997 | Lin | |
| 5,659,797 A | * 8/1997 | Zandveld et al. | |
| 5,713,037 A | * 1/1998 | Wilkinson et al. | |
| 5,717,943 A | * 2/1998 | Barker et al. | |
| 5,734,921 A | * 3/1998 | Dapp et al. | |
| 5,742,180 A | * 4/1998 | Detton et al. | |
| 5,748,872 A | * 5/1998 | Norman | |
| 5,754,871 A | * 5/1998 | Wilkinson et al. | |
| 5,761,484 A | * 6/1998 | Agarwal et al. | |
| 5,778,439 A | * 7/1998 | Timberger et al. | |
| 5,794,059 A | * 8/1998 | Barker et al. | 712/10 |
| 5,801,715 A | * 9/1998 | Norman | |
| 5,828,858 A | * 10/1998 | Athanas | |
| 5,838,165 A | * 11/1998 | Chatter | |
| 5,844,888 A | * 12/1998 | Narjjyka | |
| 5,867,691 A | * 2/1999 | Shiraishi | |
| 5,892,961 A | * 4/1999 | Trimberger et al. | |
| 5,915,123 A | * 6/1999 | Mirsky et al. | |
| 5,927,423 A | * 7/1999 | Wada et al. | |
| 5,936,424 A | * 8/1999 | Young et al. | |
| 5,956,518 A | * 9/1999 | DeHon et al. | |
| 6,014,509 A | 1/2000 | Furtek et al. | |
| 6,034,538 A | 3/2000 | Abramovici | |
| 6,052,773 A | 4/2000 | DeHon et al. | |
| 6,054,873 A | 4/2000 | Laramie | |
| 6,108,760 A | 8/2000 | Mirsky et al. | |
| 6,122,719 A | 9/2000 | Mirsky et al. | |
| 6,127,908 A | 10/2000 | Bozler et al. | |
| 6,202,182 B1 | 3/2001 | Abramovici et al. | |
| 6,282,627 B1 | 8/2001 | Wong et al. | |

OTHER PUBLICATIONS

M. Morris Mano, "Digital Design," by Prentice Hall, Inc., Englewood Cliffs, New Jersey 07632, 1984, pp. 119–125, 154–161.

M. Saleeba, "A Self–Contained Dynamically Reconfigurable Proessor Architecture", Sixteenth Australian Computer Science Coinferene, ASCS–16, QLD, Australia, Feb., 1993.

Maxfield, C. "Logic that Mutates While–U–Wait" EDN (Bur. Ed.) (USA), EDN (European Edition), Nov. 7, 1996, Cahners Publishing, USA.

Myers, G., Advances in Computer Architecture Wiley–Interscience Publication, 2nd ed., John Wiley & Sons, Inc. pp. 463–494, 1978.

Norman, Richard S., Hyperchip Business Summary, The Opportunity, Jan. 31, 2000, pp. 1–3.

Villasenor, John, et al., "Configurable Computing Solutions for Automatic Target Recognition," IEEE, 1996 pp. 70–79.

Villasenor, John, et al., "Configurable Computing." Scientific American, vol. 276, No. 6, Jun. 1997, pp. 66–71.

* cited by examiner

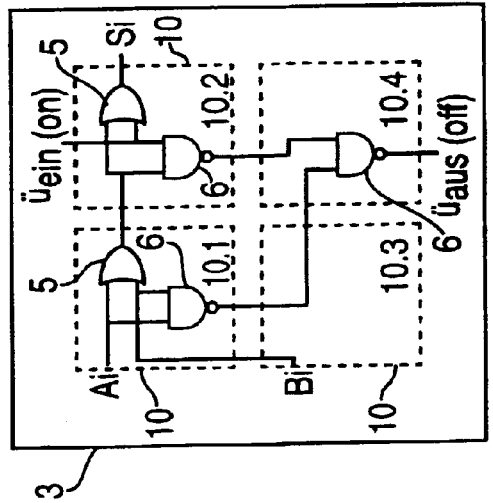
FIG. 4
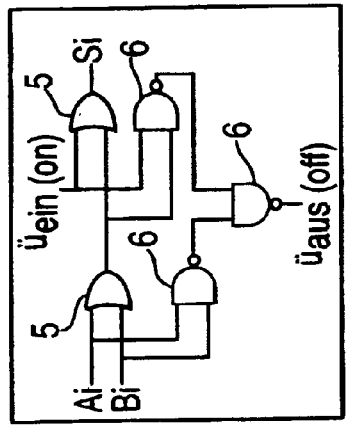
FIG. 3
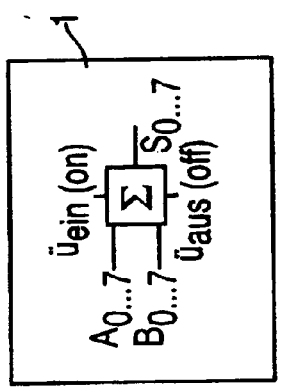
FIG. 1
FIG. 2

DATA PROCESSING SYSTEM

This application is a continuation of prior application No. 08/544,435, Filed Nov. 17, 1995, now U.S. Pat. No. 5,943,242.

BACKGROUND OF THE INVENTION

The present invention relates to a data processing system, i.e., a hardware unit for logical manipulation (linkage) of data (information) available in binary form.

Data processing systems of this type have by now been known long since, and they have already found broad application and recognition. The basic structure and operation of prior data processing systems can be defined approximately as comprising an arithmetic-logic linking unit in which the data to be linked are processed according to program instructions (software). In the process, the data are retrieved appropriately via a controller by more or less complex addressing procedures and, to begin with, kept ready in working registers. Following the logical linkage, the new data are then filed again in a preset memory location. The arithmetic-logic linkage unit consists of logical linking modules (gates, members) that are coupled to one another in such a way that the data to be manipulated allows in accordance with the underlying software logical processing using the four basic arithmetic operations.

It is easily perceivable that on the basis of the known structures there is relatively much computing time required for reading the data to be manipulated, transferring the data to the working registers, passing the data on to specific logic modules in the arithmetic-logic linking unit and, lastly, store the data again. Also, it is readily evident that the hardware structure of the arithmetic-logic linking unit cannot be considered as optimal inasmuch as the integrated logic hardware modules are actively used within the overall system always only in one and the same way. Similarly, a compilation of functions in so-called pipelines is very much impeded or restricted by strict hardware specification, which of necessity means frequent register reloading between working registers and central processing unit. Furthermore, such modules lend themselves poorly to cascading and require then substantial programming work.

An additional advantage of the present invention is that a widely scalable parallelity is available. Created here is a basis for a fast and flexible creation of neuronal structures such as to date can be simulated only at considerable expense.

The objective underlying the present invention is to propose a data processing system which hereafter will be referred to as data flow processor (DFP), where a greater, or better, flexibility of the overall structure and data flow as well as pipelining and cascading options result in increased processor capacity, or linking capacity.

Besides its employment as strictly a data flow processor, the DFP is meant to be able to handle the following further tasks:

utilization as universal module in setting up conventional computers, making the structure simpler and less expensive;

utilization in neuronal networks.

This objective is accomplished by providing an integrated circuit (chip) with a plurality of cells which, in particular, are arranged orthogonally to one another, each with a plurality of logically same and structurally identically arranged cells, whose arrangement and internal bus structure is extremely homogeneous so as to facilitate programming. Nonetheless, it is conceivable to accommodate within a data flow processor cells with different cell logics and cell structures in order to increase the capacity in that, for example, there exist for memory access other cells than for arithmetic operations. A certain specialization can be advantageous, especially for neuronal networks. Coordinated with the cells is a loading logic by way of which the cells, by themselves and facultatively grouped in so-called MACROs, are so programmed that, for one, selective logical functions but, for another, also the linking of cells among themselves can be realized widely. This is achieved in that for each individual cell a certain memory location is available in which the configuration data are filed. These data are used to switch multiplexers or transistors in the cell so as to guarantee the respective cell function (refer to FIG. 12).

SUMMARY OF THE INVENTION

The core of the present invention consists in proposing a data flow processor of cellular structure whose cells allows reconfiguration in an arithmetic-logical sense, quasi randomly, via an external loading logic. Of extreme necessity is that the respective cells allow reconfiguration individually and without affecting the remaining cells or disabling the entire module. Thus, the data flow processor according to the present invention can be "programmed" as an adder in a first operating cycle and as a multiplier in a subsequent operating cycle, wherein the number of cells required for addition or multiplication may well be different and the placement of already loaded MACROs is upheld. It is incumbent upon the loading logic, or compiler, to partition the newly loaded MACRO within the available cells (i.e., to dissect said MACRO in such a way that it allows optimum insertion). The sequence control of the program is assumed by the compiler, which loads the appropriate MACROs in the module in accordance with the presently performed program section, the loading process being concomitantly controlled by the yet to be described synchronization logic, which determines the moment of reloading. Therefore, the DFP does not Correspond to the known von Neumann architecture, since the data and program memories are separate. But this means at the same time increased security, since faulty programs cannot destroy a CODE, but merely DATA.

To give the data flow processor a workable structure, several cells—among others the input/output functions (I/O) and memory management functions—are loaded prior to loading the programs and remain constant usually for the entire run time. This is necessary in order to adapt the data flow processor to its hardware environs. The remaining cells are combined to so-called MACROs and allow reconfiguration, nearly at random and without affecting neighboring cells, during run time. To that end, the cells are individually and directly addressable.

The data flow processor may be adjusted, by way of the compiler, optimally and, as the case may be, dynamically to a task to be performed. Associated with this, e.g., is the great advantage that new standards or similar can be converted solely by reprogramming the data flow processor, not requiring as heretofore replacement and corresponding accrual of electronic scrap.

The data flow processors are suited for cascading, which results in a nearly random increase of parallelization, computing capacity as well as network size in neuronal networks. Especially important here is a clear homogeneous linkage of cells with the input/output pins (I/O pin) of the data flow processors, for maximum circumvention of program restrictions. So-called shared memories can be used for better communication between data flow processors and the compiler. For example, programs from a hard disk situated in the O/I area of a data flow processor can be passed on to the compiler, in that the data flow processors write the data from the disk to the shared memory for retrieval by the compiler. This is especially important, since here, as already mentioned, not a von Neumann architecture exists, but a Harvard architecture. Similarly, shared memories are advantageous when constants defined in the program—which reside in the memory area of the compiler—are meant to be linked with data residing in the memory area of the data flow processors.

A special application of the inventional data flow processor is constituted in that—in conjunction with suitable input/output units, for one, and a memory for another—it may form the basis for a complete (complex) computer.

A further area of application is setting up large neuronal networks. Its particular advantage is constituted here by its high gate density, its excellent cascading as well as its homogeneity. A learning process comprising a change of individual axiomatic connections, or individual cell functions, is on customary modules just as difficult to perform as the setup of homogeneous and at the same time flexible cell structures. Dynamic reconfigurability enables for the time an optimum simulation of learning processes.

BRIEF DESCRIPTION OF THE DRAWINGS

The present invention will be more fully explained hereafter with the aid of the drawings which show the following:

FIG. 1, a wiring symbol for an 8-bit adder;

FIG. 2, a wiring symbol for an 8-bit adder according to FIG. 1 consisting of eight 1-bit adders;

FIG. 3, a logical structure of a 1-bit adder according to FIG. 2;

FIG. 4, a cell structure of the 1-bit adder according to FIG. 3;

DETAILED DESCRIPTION

Figure 5:
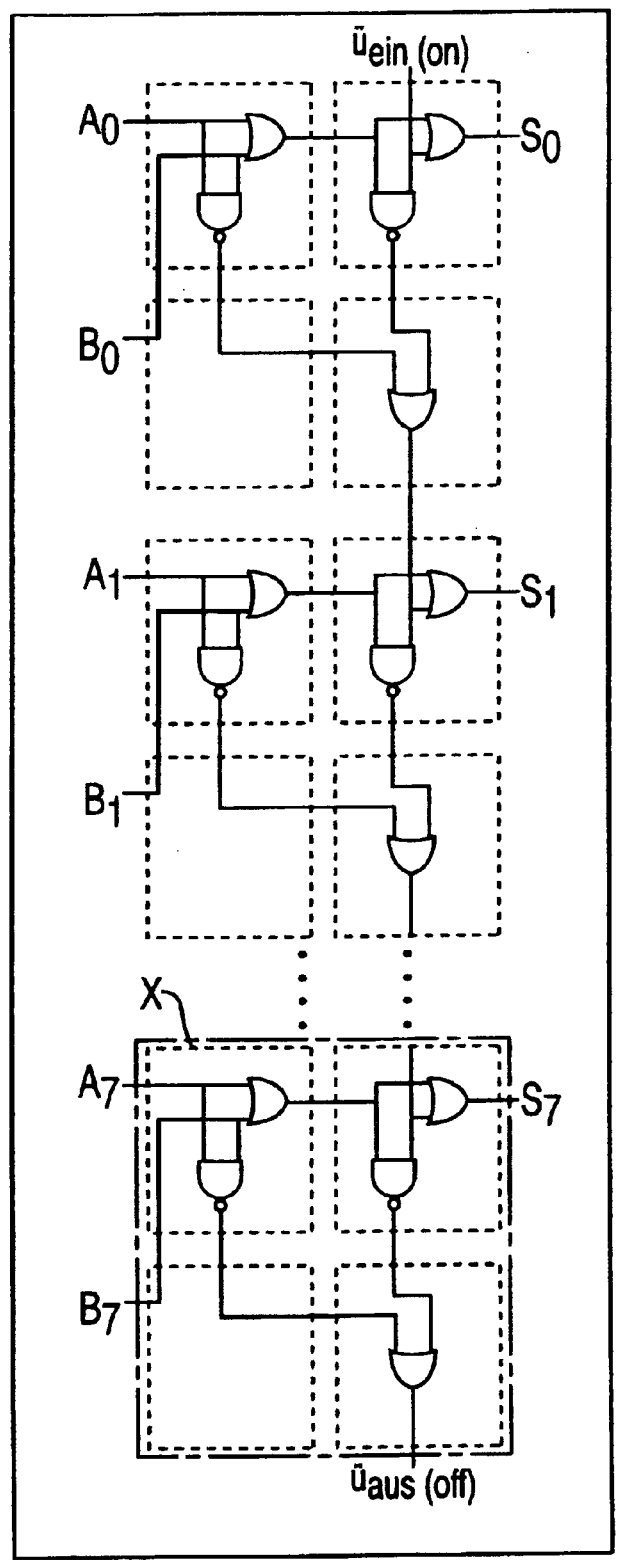
FIG. 5, an 8-bit adder composed according to the cell structure relative to FIG. 1.

FIG. 1 illustrates a circuitry symbol for an 8-bit adder. Said wiring symbol consists of a quadratic module 1 with eight inputs A 0 . . . 7 for a first data word A and eight inputs B 0 . . . 7 for a second data word B (to be added). The eight inputs Ai, Bi are supplemented each by a further input Üein, by way of which, as the case may be, a carry-over is passed on to the module 1. In keeping with its function and purpose, the module 1 has eight outputs S 0 . . . 7 for binary summands and a further output Üaus for any existing carry-over.

The circuitry symbol illustrated in FIG. 1 is shown in FIG. 2 as an arrangement of so-called SUBMACROs. Said SUBMACROs 2 consist each of a 1-bit adder 3 with one input each for the appropriate bits of the data word and a further input for a carry-over bit. Furthermore, the 1-bit adders 3 feature an output for the summand and an output for the carry-over Üaus.

Shown in FIG. 3 is the binary logic of a 1-bit adder, or SUBMACRO 2 according to FIG. 2. Analogous to FIG. 2, this logic features one input Ai, Bi each for the conjugate bits of the data to be linked; an input Üein is provided additionally for the carry-over. These bits are linked in accordance with the illustrated connections, or linkages, in two OR members 5 and three NAND members 6 so that on the output port Si and on the output for the carry-over Üaus the linkage results (Si, Üaus) corresponding to a full adder are present.

The invention sets in—as illustrated in FIG. 4—where the implementation of SUBMACRO 2 shown in FIG. 3 or of one or several random functions in a suitable manner in a cell structure is involved. This is handled on the basis of logically and structurally identical cells 10, the individual logic modules of which are coupled with one another in accordance with the linkage function to be carried out, and at that, by means of the yet to be described compiler. According to the linking logic shown in FIG. 4 and deriving from the compiler according to FIG. 3 for a 1-bit adder, two cells 10.1, 10.2 each are with respect to the logic modules insofar identical as always an OR member 5 and a NAND member 6 are activated. The third cell 10.3 is used only as a line cell (PC conductor cell), and the fourth cell 10.4 is switched active with regard to the third NAND member 6. The SUBMACRO 2 consisting of the four cells 10.1 . . . 10.4 is thus representative for a 1-bit adder, that is, a 1-bit adder of a data processing system according to the present invention is realized via four appropriately programmed (configured,) cells 10.1 . . . 10.4. (For the sake of completeness it is noted here that the individual cells possess an appreciably more extensive network of logic modules, or linkage members, and inverters, each of which can be switched active according to the relevant instruction by the compiler. Also provided, in addition to the logic modules, is a dense network of connecting lines between adjoining modules and for the setup of line and column bus structures for data transfer, so that appropriate programming on the part of the compiler allows implementation of quasi random logic linking structures.)

FIG. 5 illustrates for the sake of completeness the cell structure of an 8-bit adder in its entirety. The illustrated structure corresponds insofar to that relative to FIG. 2, with the 1-bit adders shown in FIG. 2 symibolically as SUB-MACROs 2 being replaced each by a four-cell unit 10.1 . . . 10.4. Based on the inventional data flow processor, this means that thirty-two cells of the available entirety of cells of a PC board fabricated cellularly with logically identical layout are accessed and configured, or programmed, by the compiler, in such a way that these thirty-two cells form one 8-bit adder.

In FIG. 5, a dash-dot bordering separates pictorially a SUBMACRO "X", which ultimately is to be viewed as a subunit comprised of four cells programmed to correspond to a 1-bit adder (10 according to FIG. 4).

Figure 6:
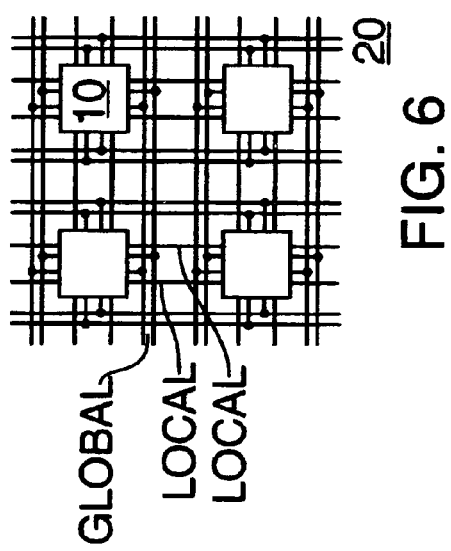
FIG. 6, an unprogrammed SUBMACRO X consisting of four cells (analogous to a 1-bit adder relative to FIG. 4, or FIG. 5) with the necessary line connections.

1. The SUBMACRO "X" set off in FIG. 5 is illustrated in FIG. 6 as part of an integrated circuit (chip) 20, along with line and data connections. The SUBMACRO "X" consists of the four cells 10, which in accordance with the orthogonal structure possess per side four data connections (that is, totally 16 data connections per cell). The data connections join neighboring cells, so that it can be seen how, e.g., a data unit is being channeled from cell to cell. The cells 10 are activated, for one, via so-called local controls—which are local lines connected to all cells—and, for another, via so-called global lines, i.e., lines routed through the entire integrated circuit (chip) 20.

Figure 7:
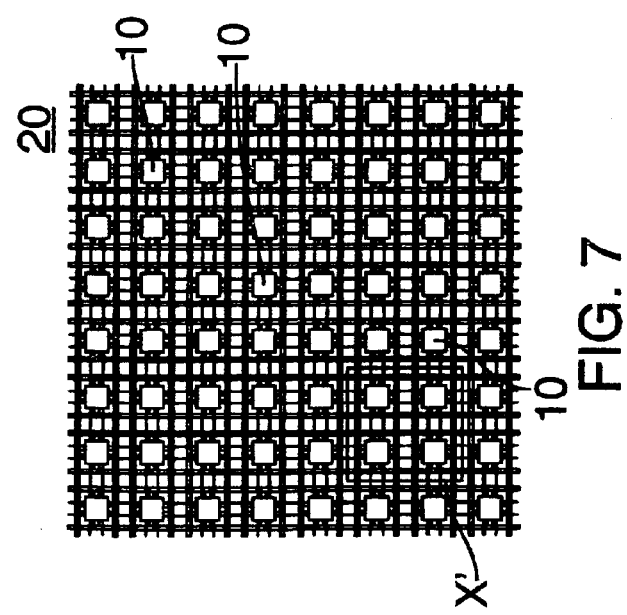
FIG. 7, a partial section of an integrated circuit (chip) with a plurality of cells and a separate SUBMACRO X according to FIG. 6.

FIG. 7 illustrates a scaled-up section of an integrated circuit 20 that is allocated to an orthogonal raster of cells 10. As indicated in FIG. 7, e.g., a group of four cells 10 can thus be selected as SUBMACRO "X" and programmed, or configured, according to the 1-bit adder in FIG. 4.

Figure 8:
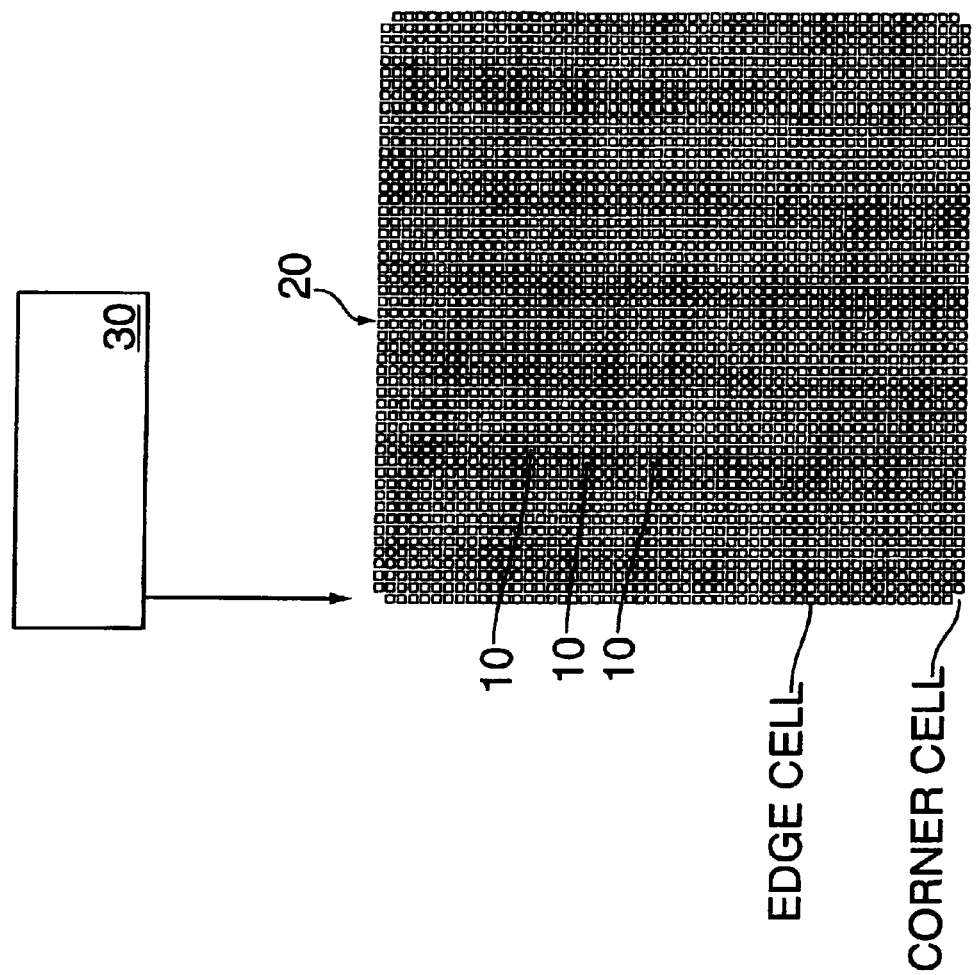
FIG. 8, an integrated circuit (chip) with an orthogonal structure of a quasi random plurality of cells and an externally assigned compiler.

A complete integrated circuit (chip) 20 is illustrated in FIG. 8. This integrated circuit 20 consists of a plurality of cells 10 arranged in the orthogonal raster and possesses on its outside edges an appropriate number of line connectors (pins) by way of which signals, specifically activation signals, and data can be fed and relayed. In FIG. 8, the SUBMACRO "X" according to FIG. 5-6 is distinguished again, and additionally there are further SUBMACROs separated and combined in subunits in accordance with specific functions and integrations. Coordinated with the integrated circuit (chip) 20, or superposed, is a compiler 30 by way of which the integrated circuit 20 is programmed and configured. The compiler 30 merely instructs the integrated circuit 20 how it should operate arithmetically-logically.

With reference to FIG. 1 through 5, for one, FIG. 8 emphasizes the SUBMACRO "X" in FIG. 4 and FIG. 5; on the other hand, also a MACRO "Y" according to FIGS. 1 and 2 is shown, which as a unit corresponds to an 8-bit adder.

Figure 10:
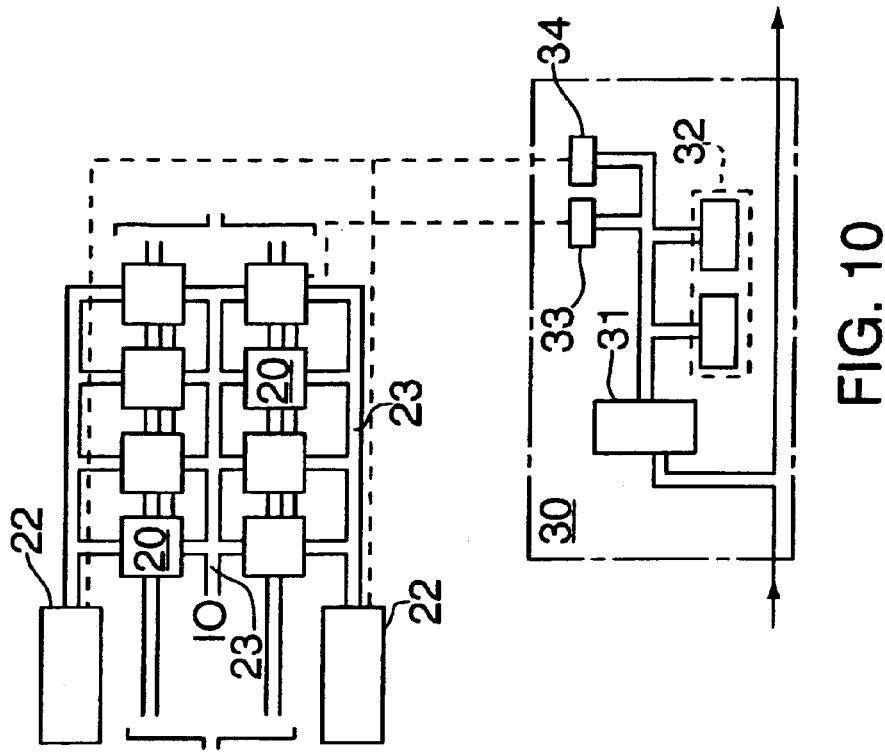
FIG. 10, a second exemplary embodiment of a plurality of integrated circuits coupled to form a central processor (data flow processor) according to FIG. 8.
Figure 9:
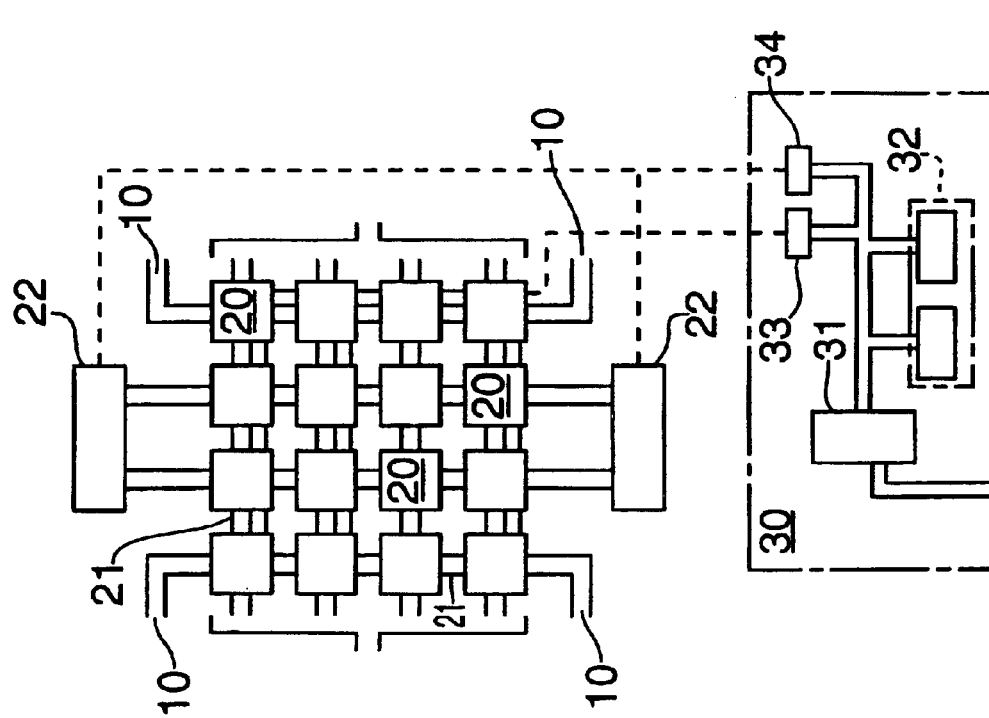
FIG. 9, a first exemplary embodiment of a plurality of integrated circuits coupled to form a central processors (data flow processor) according to FIG. 8.

FIGS. 9 and 10 will respectively describe in the following a computer structure that bases on the integrated circuit 20 defined and illustrated above.

According to the first exemplary embodiment illustrated in FIG. 9, a plurality of integrated circuits 20—analogous to the arrangement of the cells—are arranged in the orthogonal raster, with adjoining circuits being coupled, or linked, to one another via local bus lines 21. Consisting for instance of 16 integrated circuits 20, the computer structure features input/output lines I/O, by way of which the computer quasi communicates, i.e., transacts with the outside world. The computer according to FIG. 9 also features a memory 22, which according to the illustrated exemplary embodiment consists of two separate memories, each composed of RAM, ROM as well as a dual-ported RAM wired as shared memory to the compiler, which memories can be realized likewise as write-read memories or also as read memories only. Hierarchically coordinated with, or superimposed upon, the computer structure described so far is the compiler 30, by means of which the integrated circuits (data flow processor) 20 can be programmed and configured and linked.

The compiler 30 is based on a transputer 31, ie., a processor with a microcoded set of instructions, with which transputer a memory 32 is coordinated. The connection between the transputer 31 and the data flow processor is based on an interface 33 for the so-called loading data, i.e., the data which program and configure the data flow processor for its task, and on an interface 34 for the previously mentioned computer memory 22, i.e., the shared memory.

The structure illustrated in FIG. 9 represents thus a complete computer that allows case-specific or task-specific programming and configuration via the compiler 30. For the sake of completeness it is noted yet that—as indicated by arrows in conjunction with the compiler 30—several of these computers can be linked, i.e., coupled to one another.

A further exemplary embodiment of a computer structure is illustrated in FIG. 10. As opposed to FIG. 9, the local BUS lines between neighboring integrated circuits 20 are supplemented by central BUS lines 23 for solving, e.g., specific input or output problems. Also the memory 22 (shared memory) connects via central BUS lines 23 to the integrated circuits 20, and at that, as illustrated by groups of these integrated circuits. The computer structure illustrated in FIG. 10 features the same compiler 30 as illustrated with the aid of FIG. 9.

Figure 11A:
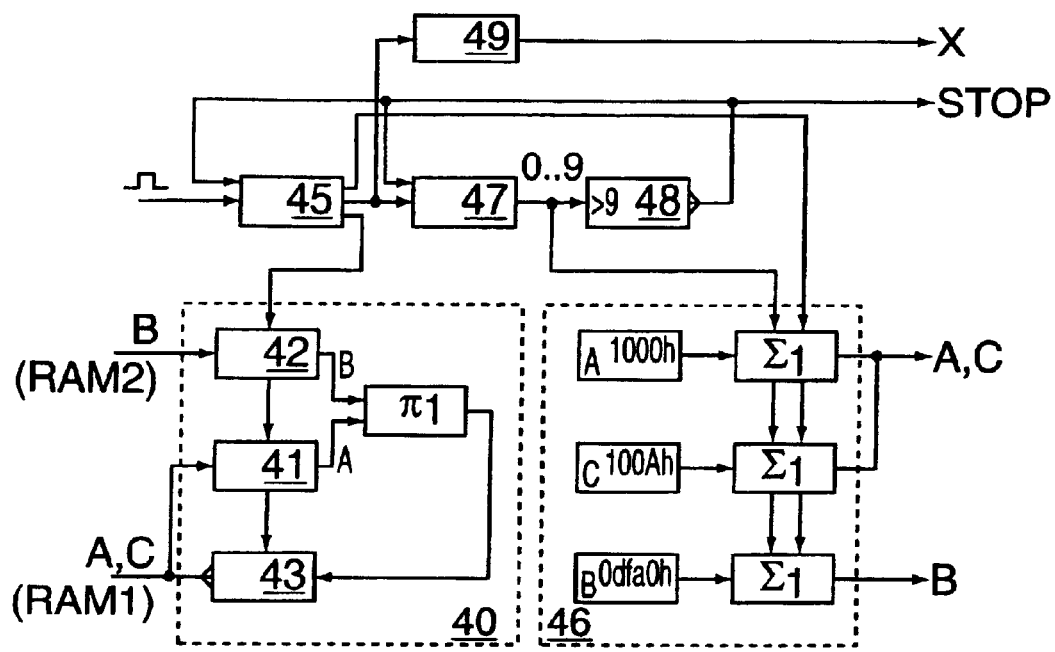
FIGS. 11a–11c an exemplary embodiment of a MACRO for adding two numerical series.

FIG. 11a serves to illustrate an adding circuit based on data flow processors according to the invention, basing on two numerical series An and Bn for all n's between 0 and 9. The task is forming the sum $Ci=Ai+Bi$, where the index $i$ may assume the values $0<=n<9$.

With reference to the illustration relative to FIG. 11a, the numerical series An is stored in the first memory RAM1, and at that, for instance starting with a memory address 1000h; the numerical series Bn is stored in a memory RAM2 at an address 0dfa0h; the sum CD is written into RAM1, and at that, at the address 100ah.

Another counter 49 is connected, which merely increments the clock cycles authorized by the control circuit. This is to demonstrate in the following the reconfigurability of individual MACROs, without affecting those MACROs which do not participate in the reconfiguration.

FIG. 11a, to begin with, shows the actual addition circuit 40, which is comprised of a first register 41 for receiving the numerical series An and of a second register 42 for receiving the numerical series Bn. The two registers 41–42 are followed by an 8-bit adder corresponding to the MACROL illustrated in FIG. 1. The output of MACROL leads by way of a driver circuit 43 back to RAM1. The clock, or time, control of the addition circuit 40 is handled by a timer control (STATEMACHINE) 45 activated by a clock generator T and connected to the registers 41, 42 and the driver circuit 43.

The addition circuit 40 is functionally supplemented by an address circuit 46 for generating the address data for the addition results to be stored. The address circuit 46, in turn, consists of three MACROs 1 (according to FIG. 1) for address data generation, which MACROs 1 are switched as follows: the addresses to be linked, for An, Bn, Cn, are fed each via an input. These addresses are added to the output signals of a counter 47 and linked by the Statemachine 45 in such a way that a new target address prevails on the output. The task of counter 47 and comparator 48 is safeguarding that always the correct summands will be linked and that the process will abort always at the end of the numerical series, that is, at n=9. Once the addition is completed, the timer control 45 generates a STOP signal, which switches the circuit to its passive side. Similarly, the STOP signal can be used as an input signal for a synchronizing circuit, in that the synchronizing logic can with the aid of this signal recognize that the overall function "adding" has been completed in accordance with the ML1 program described in the following, and the MACROs thus can be replaced by new ones (for example, STOP could be the signal Sync5).

The time sequence in the timer 45 (STATEMACHINE) may be represented as follows, in which context it is noted yet that a delay time T (in the form of clock cycles) is implemented in the timer control 45, between address generation and data receipt:

In cycle 1, the counter 47 is incremented always by 1, while the comparator 48 tests whether n>9 has been reached; in synchronism with these operations, the addresses for A, B, C are computed;

in the cycle (T+1), the summands A, B are read out and added;

in cycle (T+2), the sum C is stored.

In other words, this means that the operating loop and the addition proper require exactly (T+2) clock cycles. T requires generally 2 ... 3 clock cycles, so that—as compared to conventional processors (CPU), which generally need 50 to several 100 clock cycles—a quite appreciable computing time reduction is possible.

The configuration presented with the aid of FIG. 11 shall be illustrated once more in the following by way of a hypothetical MACRO language ML1.

Given are the numerical series An and Bn $\forall n: 0<=n<9$

To be formed are the sums Ci=Ai+Bi, with I ∈ N.
const n=9;
array A [n] in RAM [1] at 1000h;
array B [n] in RAM [2] at 0dfa0h;
array C [n] in RAM [1] at 100ah;
for i=0 to n with (A [i], B [i], C [i])
    Δ1

$C=\Delta 1=A+B;$ next;
RAM 1 is the 1 st memory block
RAM 2 is the 2 nd memory block
at follows the base address of the arrays

| | |
|---|---|
| for | is the loop start |
| next | is the loop end |
| with ( ) | follow the variables whose addresses are determined by the counting variable i |

Δ T follows the delay time for a Statemachine in clock cycles.

Hence, the timing of the Statemachine looks as follows:

| Cycle | Activity |
|---|---|
| 1 | Increment counter, compare to > 9 (yes => abort) and compute addresses for A, B, C |
| T + 1 | Retrieve and add A, B |
| T + 2 | Store in C |

That is—as already mentioned—the loop and the addition require exactly one time T+2 clock cycles.

Figure 11B:
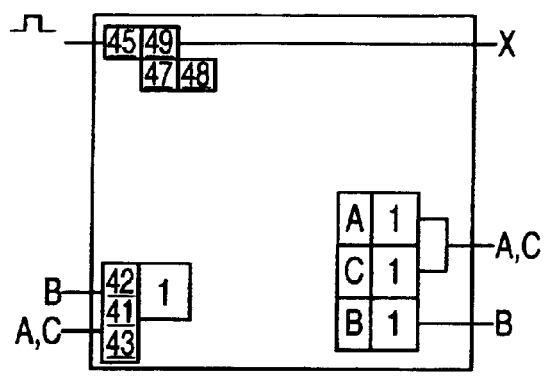

FIG. 11b shows the rough structure of the individual functions (MACROs) in a DFP. The MACROs are depicted in their approximate position and size and referenced using the appropriate numbers illustrated with the aid of FIG. 11a.

Figure 11C:
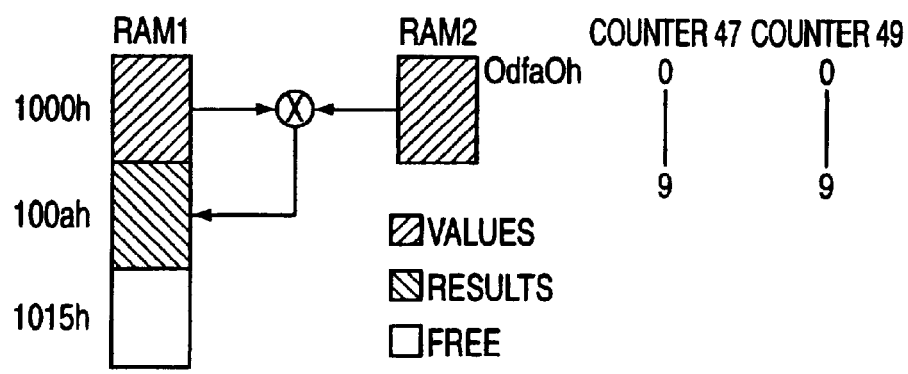

FIG. 11c shows the rough structure of the individual functions on the RM blocks 1 and 2: the summands are successively read in ascending order from the RAM blocks 1 and 2 beginning with address 1000h, or 0dfa0h, and stored in RAM block 1 from address 100ah. Additionally, there are the counters 47 and 49, both counting during the sequence of the circuit from 0 to 9.

Following completion of the described program, a new program is to be loaded which handles the further processing of the results. The reloading is to take place at the run time: The program is given in the following:

Available are the numerical series An and Bn, with An given by the results Cn of the program run before:

$\forall n: 0<=n<=9$

To be formed are the products Ci=Ai*Bi with I ∈ N.
const n=9;
array A [n] in RAM [1] at 100ah;
array B [n] in RAM [2] at 0dfa0h;
array C [n] in RAM [1] at 100ah;
for i=0 to n with (A [i], B [i], C [i])
    Δ1;

$C=\Delta 1=A*B;$ next;
The description of the individual instructions is already known, symbolizes multiplication.

Figure 18A:
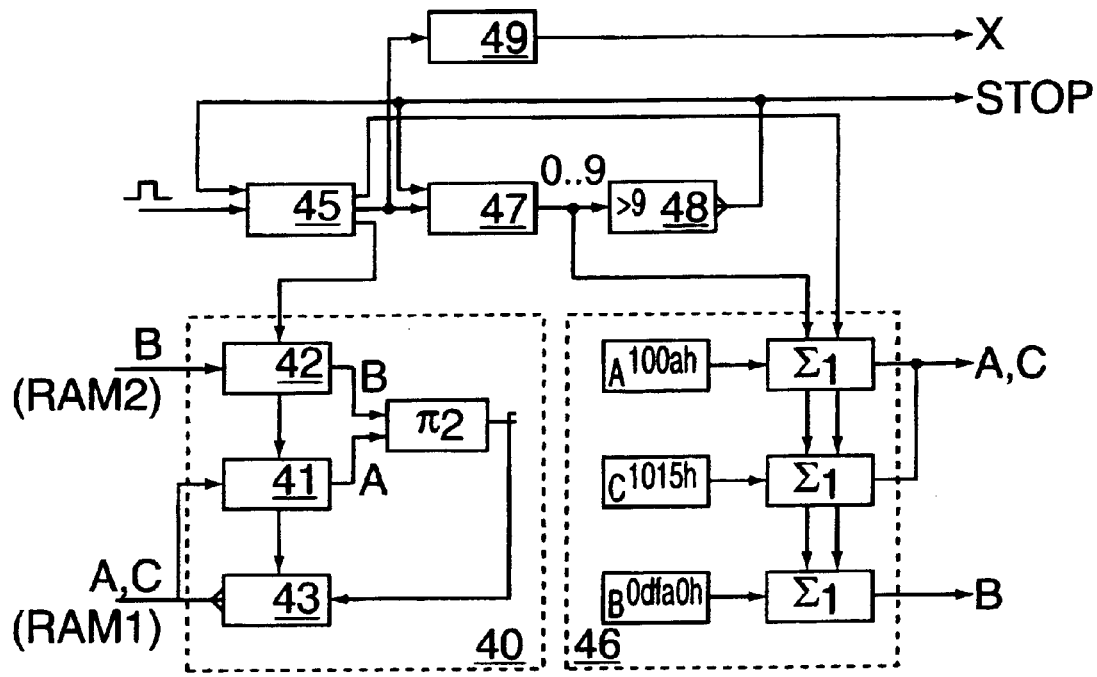
FIG. 18a, a multiplication circuit (compare FIG. 11a)
Figure 18B:
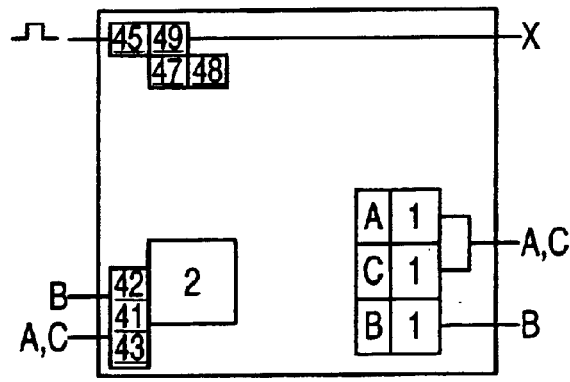
FIG. 18b, the internal structure of the DFP after loading (compare FIG. 11b)
Figure 18C:
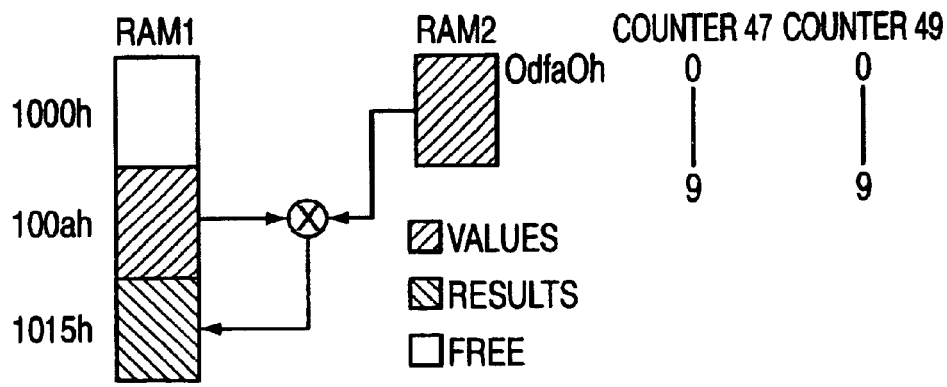
FIG. 18c, a result of multiplication.
Figure 19A:
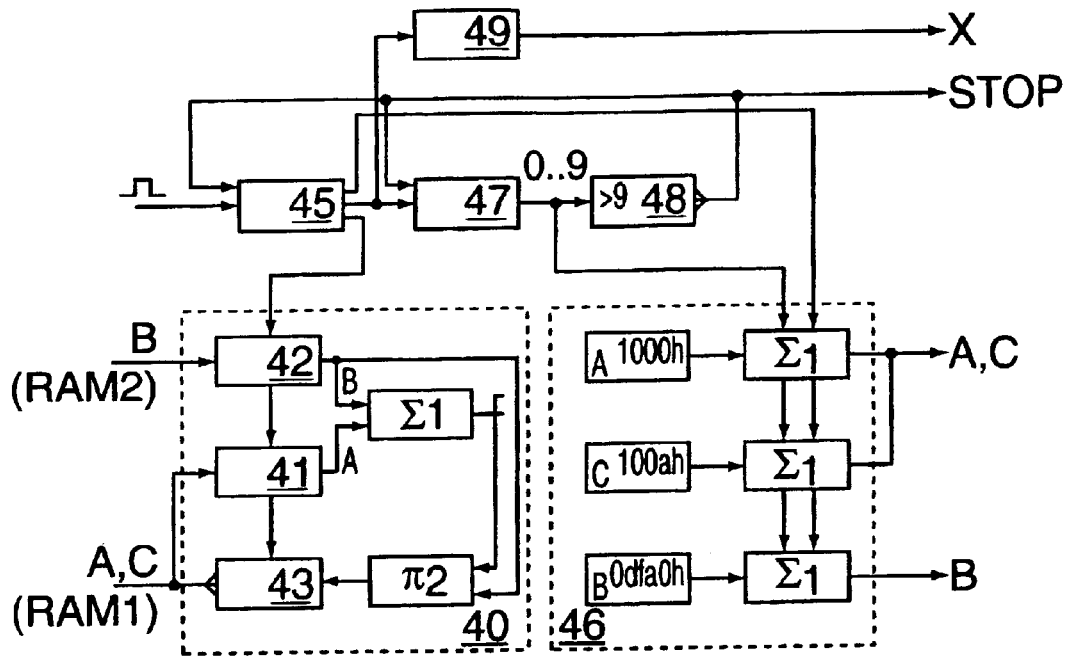
FIG. 19a, a cascade circuit, with the adder of FIG. 11 and the multiplier of FIG. 18 wired in series for increased computing capacity.
Figure 19B:
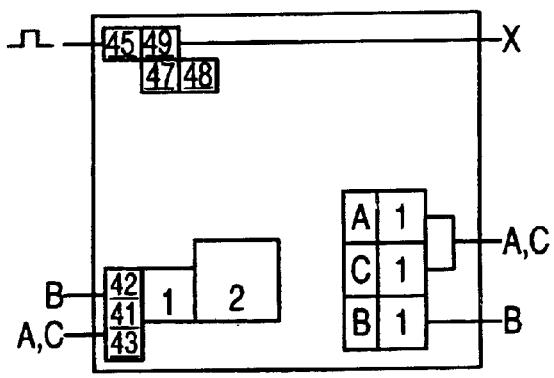
FIGS. 19b and 19c, the operating mode of the DFP in the memory, as well as the states of counters 47, 49.
Figure 19C:
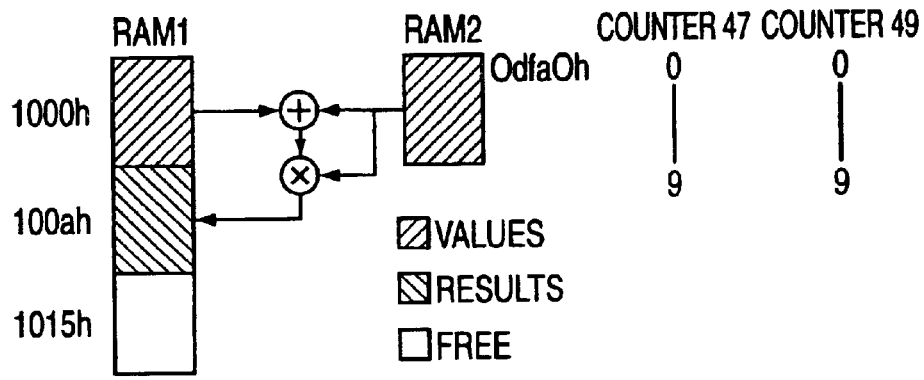

The MACRO structure is described in FIG. 18a, while FIG. 18b shows in known fashion the position and size of the individual MACROs on the chip; noteworthy is the size of the multiplier 2 as compared to the adder 1 of FIG. 11b. FIG. 18c demonstrates once again the effect of the function on the memory; counter 47 counts again from 0 to 9, that is, the counter is reset as the MACROs are reloaded.

Particular note is due counter 49. Assuming that reloading the MACROs takes 10 clock cycles, the counter 49 runs then from 9 to 19, since the module is being reloaded dynamically, that is, only the parts to be reloaded are baited while the rest continues to operate. As a consequence, the counter increments during the program sequence from 19 to 29. (This is to demonstrate the dynamic, independent reloading; in any prior module the counter would run again from 0 to 9, since it is reset).

Closer scrutiny of the problem gives rise to the question why not both operations, addition and multiplication, are carried out in one cycle, that is, the operation:

Available are the numerical series An and Bn, with An given by the result of Cn of the program run previously:

$$\forall n: 0<=n<=9$$

To be formed are the products $Ci=(Ai+Bi)*Bi$ with $I \in N$.
path D;
const n=9;
array A [n] in RAM [1] at 1000h;
array B [n] in RAM [2] at 0dfa0h;
array C [n] in RAM [1] at 100ah;
for i=0 to n with (A [i], B [i], C [i])
  Δ1;
  D=Δ1=AbB;
  C=Δ1=D*B;
next; path D defines an internal double path that is not taken outside the DFP. Owing to an additional 1, the operation requires one clock cycle more than before, but is overall faster than the two above programs performed successively, because, for one, the loop is being passed only once and, for another, there is no reloading taking place.

Figure 12:
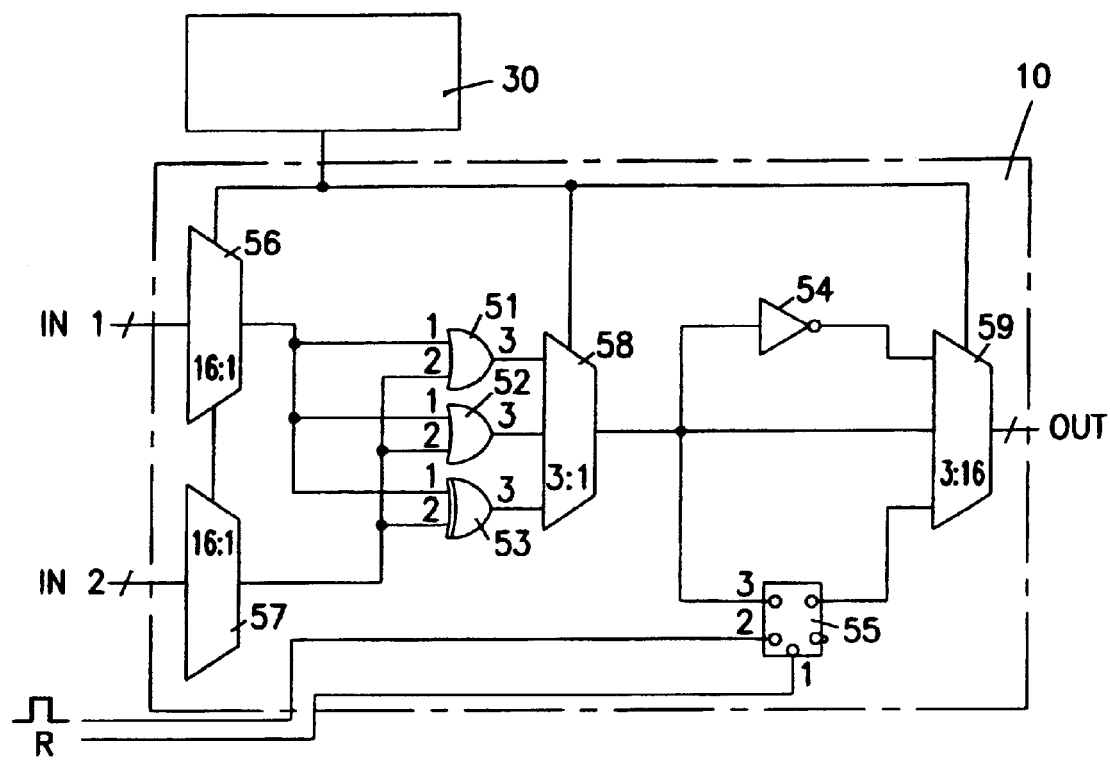
FIG. 12, an exemplary structure of a cell comprising multiplexers for selection of the respective logic modules.

Basically, the program formulation could also be as follows:
const n=9;
array A [n] in RAM [1] at 1000h;
array B [n] in RAM [2] at 0dfa0h;
array C [n] in RAM [1] at 100ah;
for i=0 to n with (A [i], B [i], C [i])
  Δ1;
  C=Δ2=(A+B)*B;
next;

When the gate run times of the adder and the multiplier combined are smaller than one clock cycle, the operation (A+B)*B can be carried out also in one clock cycle, leading to a further appreciable speed increase:
const n=9;
array A [n] in RAM [1] at 1000h;
array B [n] in RAM [2] at 0dfa0h;
array C [n] in RAM [1] at 100ah;
for i=0 to n with (A [i], B [i], C [i])
  Δ1;
  C=Δ1=(A+B)*B;
next;

A simple example of a cell structure is illustrated with the aid of FIG. 12. Cell 10 encompasses, e.g., an AND member 51, an OR member 52, an XOR member 53, an inverter 54 as well as a register cell 55. Furthermore, the cell 10 has on its input side two multiplexers 56, 57 with (corresponding to the sixteen inputs of the cell in FIG. 6), e.g., sixteen input connectors IN1, IN2 each. The (16:1) multiplexer 56/57 selects the data to be fed to the said logic members AND, OR, XOR 51 ... 53. These logic members are on the output end coupled to a (3:1) multiplexer 58 which, in turn, is coupled to the input of inverter 54, an input of register cell 55 and a further (3:16) multiplexer 59. The latter multiplexer 59 is hooked additionally to the output of inverter 54 and one output of register cell 55 and emits the output signal OUT.

For the sake of completeness it is noted that the register cell 55 is coupled to a reset input R and a clock input.

Superposed upon the illustrated cell structure, that is, of the cell 10, is now a compiler 30 that connects to the multiplexers 56, 57, 58 and 59 and activates them in accordance with the desired function.

For example, if the signals A2 are to be ANDed with B5, the multiplexers 56, 57 are switched active according to the lines "TWO" or "FIVE"; the summands proceed then to the AND member 51 and, with proper activation of multiplexers 58, 59, are surrendered at the output OUT. If a NAND linkage is to be carried out, e.g., the multiplexer 58 switches to the inverter 54, and the negated AND result prevails then on the output OUT.

To synchronize the restructuring (reloading) of the cells or MACROs with the compiler, a synchronization circuit that sends the appropriate signals to the compiler can be accommodated as a MACRO on the data flow processor—as required, since reloading is allowed only once the MACROs have finished their previous activity. This may necessitate a modification of the usual MACROs, since these must then make status information available to the synchronization circuit.

Figure 13:
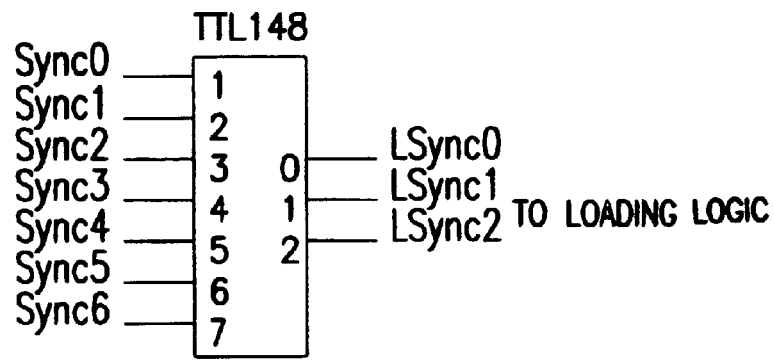
FIG. 13, a synchronizing logic circuit using, e.g., a standard TTL module 74148.

These status information usually signal the synchronization logic that some MACROs have finished their task, which from a programming aspect may mean, e.g., the termination of a procedure or reaching the termination criterion of a loop. That is, the program is continued at a different point, and the MACROs sending the status information can be reloaded. Besides, it may be of interest for the MACROs to be reloaded in a certain order. For that purpose, the individual synchronization signals may undergo a weighting by a priority decoder. Such—simple—logic is illustrated in FIG. 13. It possesses seven input signals by which the seven MACROs deliver their status information. In this case, 0 stands for "working" and 1 for "finished." The logic has three output signals that are transmitted to the compiler, with 000 designating rest status. With a signal present on one of the seven inputs, a decimalbinary conversion takes place. For example, Sync6 is represented as 110, indicating to the compiler that the MACRO servicing Sync6 has completed its task. With several synchronization signals present on the input simultaneously, the synchronization circuit transmits the signal with the highest priority to the compiler; for example, with Synch0, Sync4 and Sync6 present, the synchronization circuit first relays Sync6 to the compiler. Once the appropriate MACROs have been reloaded and Sync6 is no longer present, Sync4 is relayed etc. To demonstrate this principle, consideration may be given to the standard TTL module 74148.

Figure 14:
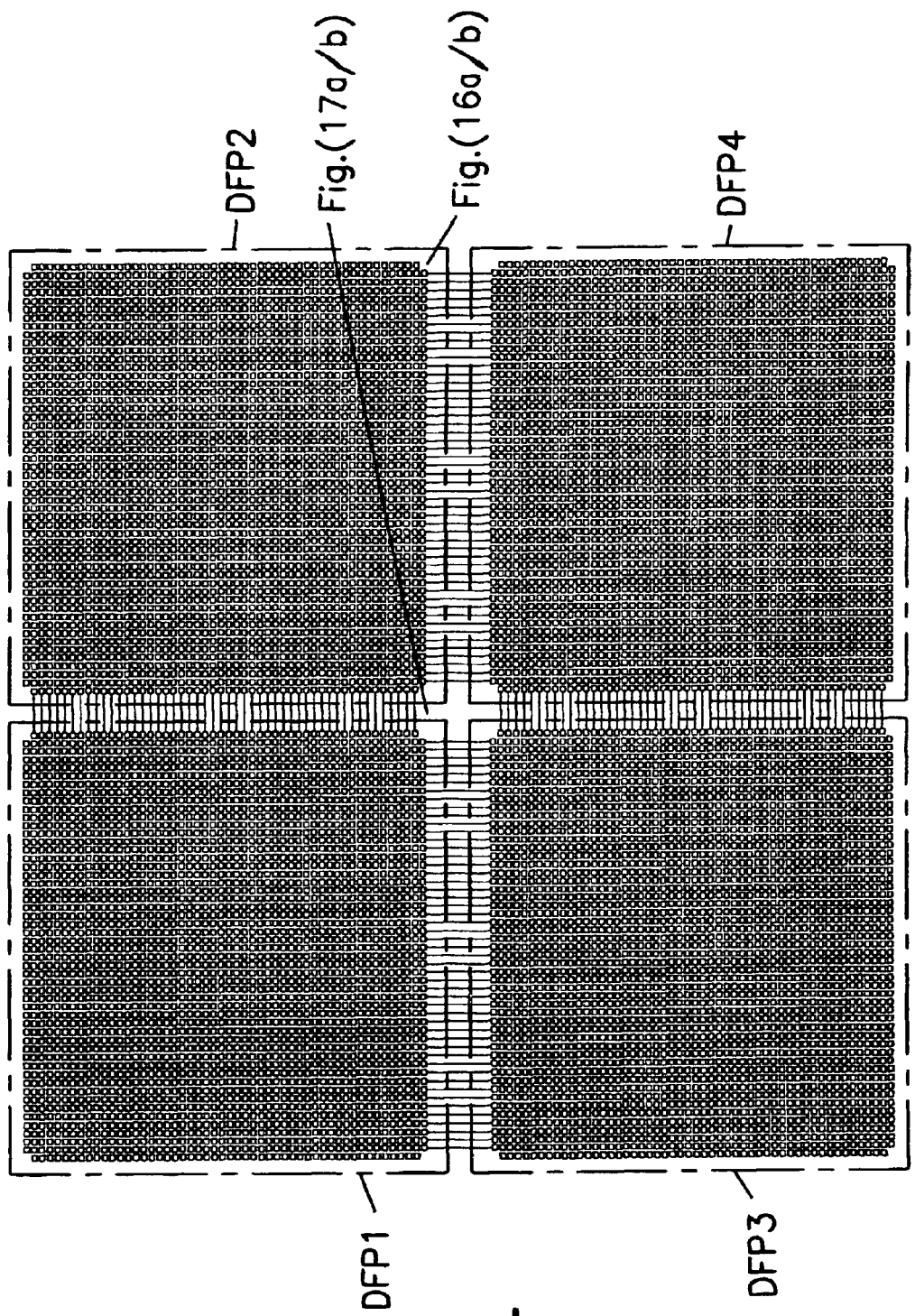
FIG. 14, the cascading of four DFPs, with the connection between I/O pins shown only schematically (actually, a depicted connection means a plurality of lines)
Figure 15:
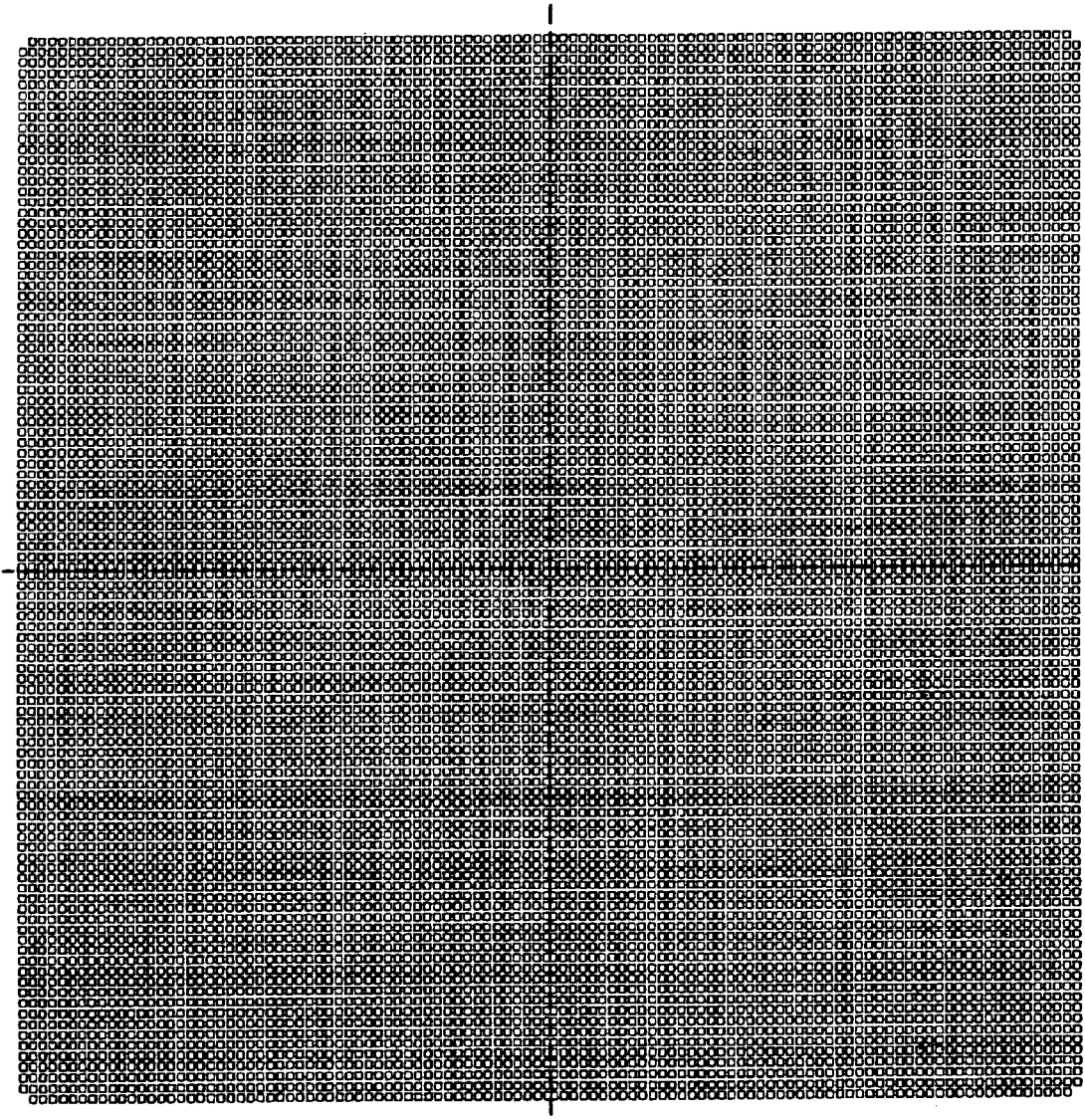
FIG. 15, the homogeneity achieved by cascading.
Figure 16A:
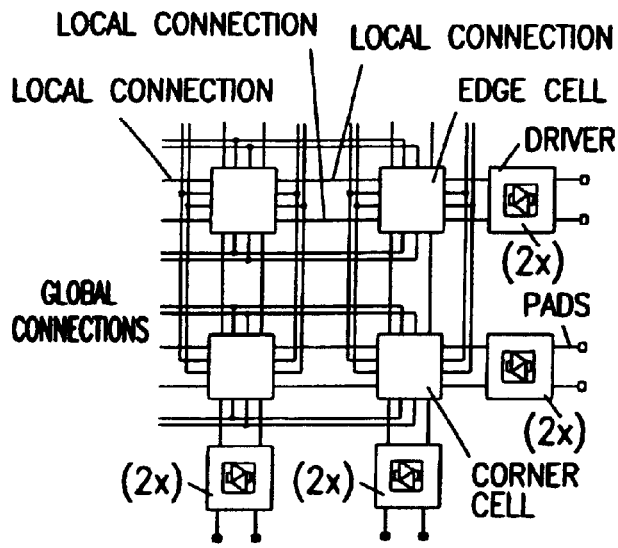
FIG. 16a, the structure of the I/O cells, with the global connections not taken outside.
Figure 16B:
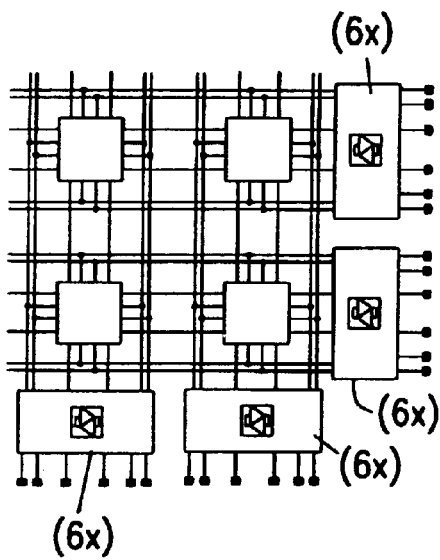
FIG. 16b, the structure of the I/O cells, but with the global connections taken outside.
Figure 17A:
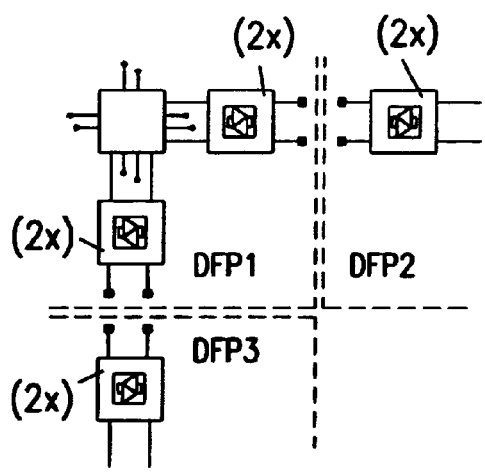
FIG. 17a, the cascading resulting from FIG. 16a, depicting a corner cell and the two driver cells communicating with it, of the cascaded modules (compare with FIG. 14)
Figure 17B:
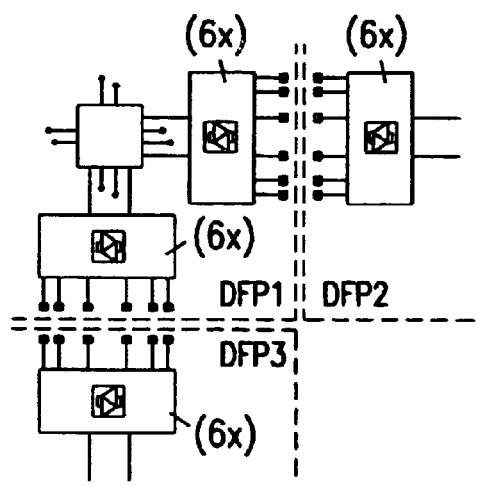
FIG. 17b, the cascading resulting from FIG. 16b, depicting a corner cell as well as the two driver cells communicating with it, of the cascaded modules (compare FIG. 14)

The data flow processors are suited for cascading. Illustrated in FIG. 14, e.g., is the cascading of four DFPs. They have the appearance of a large homogeneous module (FIG. 15). Basically two cascading methods are conceivable with it:

a) Only the local connections between the cells are taken outside, meaning presently two I/O pins per edge cell and four I/O pins per corner cell. However, the compiler/programmer must note that the global connections are not taken outside, for which reason the cascading is not completely homogeneous (global connections between several cells, usually between a complete cell row or cell column—refer to FIG. 6—;local connections exist only between two cells). FIG. 16a shows the structure of a DFP, FIG. 17a the resulting cascading of several DFPs (three being shown).

b) The local and global connections are taken outside, which drastically raises the number of required drivers-I/O pins and lines, in our example to six I/O pins per edge cell and twelve I/O pins per corner cell. The result is complete homogeneity in cascading.

Figure 22:
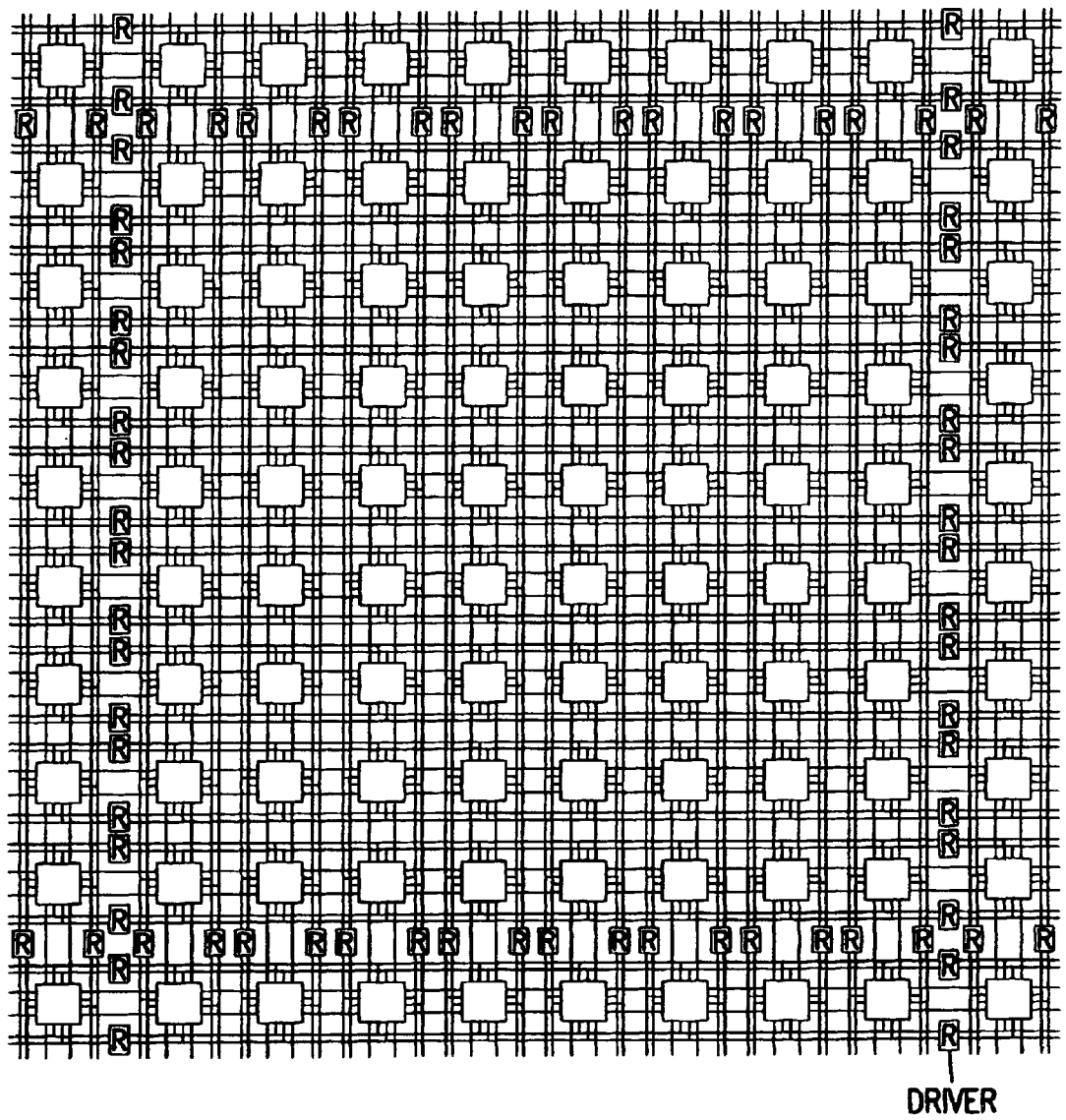
FIG. 22, a section of a DFP showing the line drivers.

Since the global connections, especially when using the cascading technique b), may become very long, the unpleasant effect may arise that the number of global connections is insufficient, since each connection—as known—can be used only by one signal. To minimize this effect, a driver may be looped through after a certain length of the global connections. For one, the driver serves to amplify the signal, which with long distances and correspondingly high loads is absolutely necessary while, for another, the driver may go into tristate and thus interrupt the signal. This allows the use of the sections left and right, or above and below the driver by different signals, provided the driver is in tristate, while otherwise a signal is looped through. Important is that the drivers of the individual global lines can be activated also individually, that is, a global signal may be interrupted, whereas the neighboring signal is looped through. Thus it is possible for different signals to be present sectionally on a global connection, whereas the global neighboring connection actually is used globally by one and the same signal (compare FIG. 22).

A special application of the inventional data flow processor is constituted in that—in conjunction with suitable input/output units, for one, and a memory for another—it may form the basis for a complete (complex) computer. A major part of the I/O functions may be implemented as MACROs on the data flow processor, and only special modules (Ethernet drivers, VRAMS . . . ) need momentarily be added externally. A change in specification, or improvements, involve then only—as already indicated—a software change of the MACRO; a hardware intervention is not required. It suggests itself here to specify an I/O connector by way of which the accessory modules can then be connected.

Figure 20:
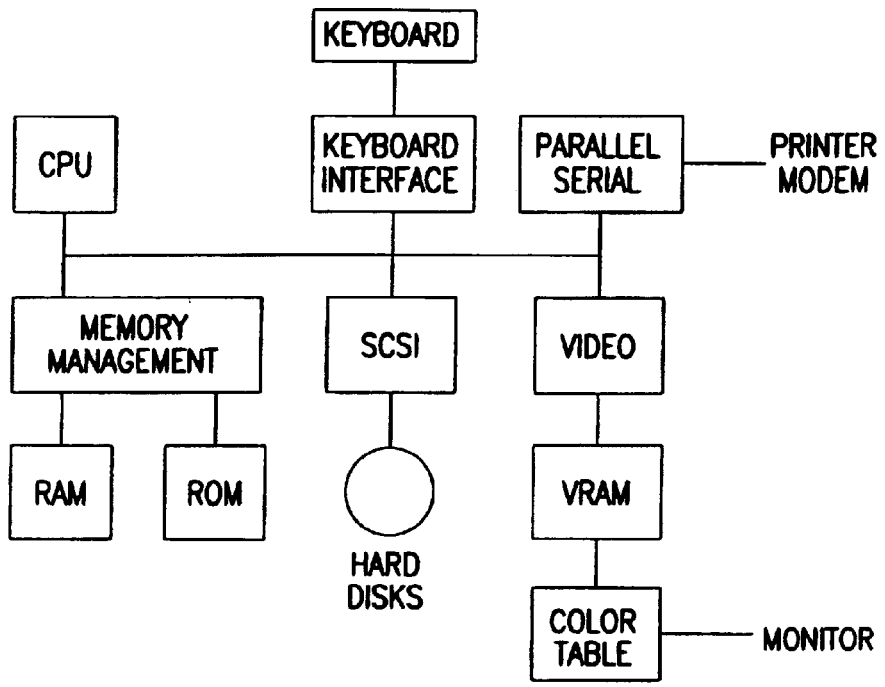
FIG. 20, the block diagram of a conventional computer.
Figure 21:
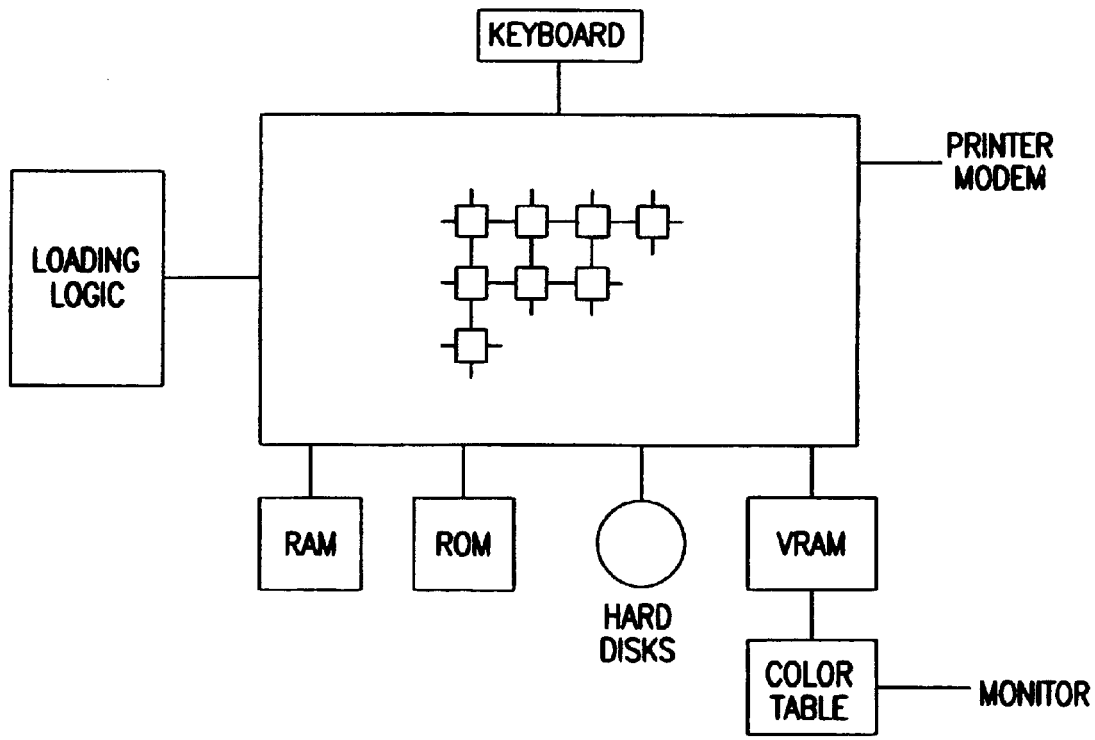
FIG. 21, the possible structure of the computer of FIG. 20 with the aid of an array of cascaded DFPs.

FIG. 20 shows the greatly simplified structure of a contemporary computer. Considerable parts can be saved by using a DFP module (FIG. 21), with the appropriate conventional modules (CPU, memory management, interfaces for SCSI, keyboard and video as well as those of the parallel and serial interfaces) being stored as MACROs in the cascaded DFPs. External wiring is required only for the parts that cannot be simulated by a DFP, such as memory and line drivers with non-TTL peaks or for high loads. Using DFPs makes for a favorable production, since one and the same module is used very frequently; the card layout is analogously simple, due to the homogeneous integration. Moreover, the structure of the computer is determined by the compiler, which here usually loads the DFP array only at the start of a run (after a reset), whereby a favorable error correction and extension option is given. Such computer notably can simulate several different computer structures by simply loading the structure of the computer to be simulated in the DFP array. It is noted that the DFP here is not working in its DFP function, but is merely available as a highly complex and freely programmable logic array while nonetheless differing from conventional modules by its especially good cascading ability.

What is claimed is:

1. A massively parallel data processing apparatus comprising:
   a plurality of computing cells arranged in a multidimensional matrix, the plurality of computing cells capable of simultaneously manipulating a plurality of data, each of the plurality of computing cells including:
      an input interface for receiving a plurality of input signals,
      a plurality of logic members, at least one of the plurality of logic members coupled to the input interface,
      at least one coupling unit selectively coupling at least one of the plurality of logic members to another of the plurality of logic members as a function of at least one of a plurality of configuration signals to arithmetic-logically configure the computing cell prior to processing the input signals, wherein coupled logic members perform at least one select arithmetic-logic operation on the input signals to process the input signals, the at least one select arithmetic-logic operation being dependent on the at least one of the plurality of configuration signals,
      a register unit selectively storing a portion of the processed input signals, and
      an output interface for transmitting the processed input signals,
      wherein the input interface of at least one of the plurality of computing cells is selectively coupled to the output interface of at least another of the plurality of computing cells; and
   a configuration interface for transmitting the plurality of configuration signals to at least some of the plurality of computing cells to arithmetic-logically configure and arithmetic-logically reconfigure the at least some of the plurality of computing cells;
   wherein each the plurality of computing cells includes associated internal state information, each of the plurality of computing cells being configured to enable transfer of the state information to at least one other of the plurality of computing cells.

2. The massively parallel data processing apparatus according to claim 1, wherein the at least one coupling unit includes a multiplexer.

3. The massively parallel data processing apparatus according to claim 1, further comprising:
   a plurality of lines for selectively coupling at least one of the plurality of computing cells to another of the plurality of computing cells.

4. The massively parallel data processing apparatus according to claim 3, wherein the selectively coupled computing cells together form a dataflow processor.

5. The massively parallel data processing apparatus according to claim 1, further comprising:
   a plurality of lines, at least one of the plurality of lines selectively coupling at least one of the plurality of computing cells to an adjacent one of the plurality of computing cells, at least another of the plurality of lines selectively coupling at least one of the plurality of computing cells to a non-adjacent one of the plurality of computing cells.

6. The massively parallel data processing apparatus according to claim 1, further comprising:
   a synchronization circuit providing a plurality of synchronization signals for synchronizing the configuration of the at least some of the plurality of computing cells.

7. The massively parallel data processing apparatus according to claim 6, wherein the synchronization circuit includes at least one of the plurality of computing cells.

8. The massively parallel data processing apparatus according to claim 1, wherein the input interface of at least one of the plurality of computing cells is coupled to an external memory device.

9. The massively parallel data processing apparatus according to claim 1, wherein the input interface of at least one of the plurality of computing cells is coupled to a peripheral device.

10. The massively parallel data processing apparatus according to claim 1, wherein the input interface of at least one of the plurality of computing cells is coupled to at least a second massively parallel data processing apparatus.

11. The massively parallel data processing apparatus of claim 1, wherein the cell configuration memory is dedicated to storing configuration information.

12. The massively parallel data processing apparatus according to claim 1, wherein each of the computing cells includes a cell configuration memory adapted to store the at least one of the plurality of configuration signals.

13. A massively parallel data processing apparatus comprising:
   a plurality of computing cells arranged in a multidimensional matrix, the plurality of computing cells capable of simultaneously manipulating a plurality of data, each of the plurality of computing cells including:
      an input interface for receiving a plurality of input signals,
      a plurality of logic members, at least one of the plurality of logic members coupled to the input interface,
      at least one coupling unit selectively coupling at least one of the plurality of logic members to another of the plurality of logic members a function of at least one of a plurality of configuration signals to arithmetic-lopically configure the computing cell prior to processing the input signals, wherein coupled logic members perform at least one select arithmetic-logic operation on the input signals to process the input signals, the at least one select arithmetic-logic operation being dependent on the at least one of the plurality of configuration signals,
      a register unit selectively storing a portion of the processed input signals, and
      an output interface for transmitting the processed input signals,
      wherein the input interface of at least one of the plurality of computing cells is selectively coupled to the output interface of at least another of the plurality of computing cells;
   a configuration interface for transmitting the plurality of configuration signals to at least some of the plurality of computing cells to arithmetic-logically configure and arithmetic-logically reconfigure the at least some of the plurality of computing cells; and
   a configuration unit coupled to the configuration interface, the configuration unit generating the plurality of configuration signals, the at least some of the plurality of computing cells being configured as a function of the at least one configuration signal during operation of the massively parallel data processing apparatus such that others of the plurality of computing cells not being configured are not haltered or impaired in their operations.

14. The massively parallel data processing apparatus according to claim 13, further comprising:
   a configuration memory coupled to the configuration unit adapted to store the plurality of configuration signals.

15. The massively parallel data processing apparatus according to claim 14, wherein the plurality of configuration signals are stored in the form of a plurality of configuration words.

16. The massively parallel data processing apparatus according to claim 15, wherein the configuration unit manages a plurality of configuration programs, at least one of the configuration programs including at least one of the configuration words.

17. The massively parallel data processing apparatus according to claim 13, wherein the configuration unit is controlled as a function of the plurality of synchronization signals.

18. A massively parallel data processing apparatus comprising:
   a plurality of computing cells arranged in a multidimensional matrix, the plurality of computing cells capable of simultaneously manipulating a plurality of data, each of the plurality of computing cells including:
      an input interface for receiving a plurality of input signals,
      a plurality of logic members, at least one of the plurality of logic members coupled to the input interface,
      at least one coupling unit selectively coupling at least one of the plurality of logic members to another of the plurality of logic members a function of at least one of a plurality of configuration signals to arithmetic-logically configure the computing cell prior to processing the input signals, wherein coupled logic members perform at least one select arithmetic-logic operation on the input signals to process the input signals, the at least one select arithmetic-logic operation being dependent on the at least one of the plurality of configuration signals,
      a resister unit selectively storing a portion of the processed input signals, and
      an output interface for transmitting the processed input signals,
      wherein the input interface of at least one of the plurality of computing cells is selectively coupled to the output interface of at least another of the plurality of computing cells;
   a configuration interface for transmitting the plurality of configuration signals to at least some of the plurality of computing cells to arithmetic-lopically configure and arithmetic-logically reconfigure the at least some of the plurality of computing cells; and
   a configuration unit coupled to the configuration interface, the configuration unit adapted to dynamically reconfigure the massively parallel data processing apparatus.

19. The massively parallel data processing apparatus according to claim 18, wherein the configuration unit is adapted to dynamically reconfigure the massively parallel data processing apparatus during a program sequence while data is still processed by the massively parallel data processing apparatus.

20. The massively parallel data processing apparatus according to claim 19, wherein said configuration unit is adapted to dynamically reconfigure—without influencing the data to be processed.

21. A massively parallel data processing apparatus comprising:
   a plurality of computing cells arranged in a multidimensional matrix, the plurality of computing cells capable of simultaneously manipulating a plurality of data, each
of the plurality of computing cells including:
an input interface for receiving a plurality of input signals,
a plurality of logic members, at least one of the plurality of logic members coupled to the input interface,
at least one coupling unit selectively coupling at least one of the plurality of logic members to another of the plurality of logic members a function of at least one of a plurality of configuration signals to arithmetic-logically configure the computing cell prior to processing the input signals, wherein coupled logic members perform at least one select arithmetic-logic operation on the input signals to process the input signals, the at least one select arithmetic-logic operation being dependent on the at least one of the plurality of configuration signals,
a register unit selectively storing a portion of the processed input signals, and
an output interface for transmitting the processed input signals,
wherein the input interface of at least one of the plurality of computing cells is selectively coupled to the output interface of at least another of the plurality of computing cells:
a configuration interface for transmitting the plurality of configuration signals to at least some of the plurality of computing cells to arithmetic-logically configure and arithmetic-logically reconfigure the at least some of the plurality of computing cells; and
a plurality of lines, at least one of the plurality of lines selectively coupling at least one of the plurality of computing cells to an adjacent one of the plurality of computing cells, at least another of the plurality of lines selectively coupling at least one of the plurality of computing cells to a non-adjacent one of the plurality of computing cells;
wherein the at least another of the plurality of lines are divided in a plurality of segments, wherein each of the plurality of segments is connected to at least another one of the plurality of segments by a tristate-bus-driver.

22. A massively parallel data processing apparatus comprising:
a plurality of computing cells arranged in a multidimensional matrix, the plurality of computing cells capable of simultaneously manipulating a plurality of data, each of the plurality of computing cells including:
an input interface for receiving a plurality of input signals,
a plurality of logic members, at least one of the plurality of logic members coupled to the input interface,
at least one coupling unit selectively coupling at least one of the plurality of logic members to another of the plurality of logic members a function of at least one of a plurality of configuration signals to arithmetic-logically configure the computing cell prior to processing the input signals, wherein coupled logic members perform at least one select arithmetic-logic operation on the input signals to process the input signals, the at least one select arithmetic-logic operation being dependent on the at least one of the plurality of configuration signals,
a register unit selectively storing a portion of the processed input signals, and
an output interface for transmitting the processed input signals,
wherein the input interface of at least one of the plurality of computing cells is selectively coupled to the output interface of at least another of the plurality of computing cells;
a configuration interface for transmitting the plurality of configuration signals to at least some of the plurality of computing cells to arithmetic-logically configure and arithmetic-logically reconfigure the at least some of the plurality of computing cells; and
a plurality of lines, at least one of the plurality of lines selectively coupling at least one of the plurality of computing cells to an adjacent one of the plurality of computing cells, at least another of the plurality of lines selectively coupling at least one of the plurality of computing cells to a non-adjacent one of the plurality of computing cells;
wherein the at least another of the plurality of lines are divided in a plurality of segments, wherein each of the plurality of segments is connected to at least another one of the plurality of segments by a transmission gate.

23. A massively parallel data processing apparatus comprising:
a plurality of computing cells arranged in a multidimensional matrix, the plurality of computing cells capable of simultaneously manipulating a plurality of data, each of the plurality of computing cells including:
an input interface for receiving a plurality of input signals,
a plurality of logic members, at least one of the plurality of logic members coupled to the input interface,
at least one coupling unit selectively coupling at least one of the plurality of logic members to another of the plurality of logic members a function of at least one of a plurality of configuration signals to arithmetic-logically configure the computing cell prior to processing the input signals, wherein coupled logic members perform at least one select arithmetic-logic operation on the input signals to process the input signals, the at least one select arithmetic-logic operation being dependent on the at least one of the plurality of configuration signals,
a register unit selectively storing a portion of the processed input signals, and
an output interface for transmitting the processed input signals,
wherein the input interface of at least one of the plurality of computing cells is selectively coupled to the output interface of at least another of the plurality of computing cells;
a configuration interface for transmitting the plurality of configuration signals to at least some of the plurality of computing cells to arithmetic-logically configure and arithmetic-logically reconfigure the at least some of the plurality of computing cells; and
a plurality of lines, at least one of the plurality of lines selectively coupling at least one of the plurality of computing cells to an adjacent one of the plurality of computing cells, at least another of the plurality of lines selectively coupling at least one of the plurality of computing cells to a non-adjacent one of the plurality of computing cells;
wherein the said at least another of the plurality of lines are divided in a plurality of segments, wherein each of the plurality of segments is connected to at least another one of the plurality of segments by an electrical switch.

24. A massively parallel data processing apparatus, comprising:

a plurality of computing cells arranged in a multidimensional matrix, each of the plurality of computing cells being arithmetic-logically configurable and reconfigurable, each of the plurality of computing cells capable of processing a first plurality of data words simultaneously with the processing of a second plurality of data words by others of the plurality of computing cells, wherein each of the plurality of computing cells is arithmetic-logically configured by a first configuration signal to perform a first select arithmetic-logic operation, and wherein each of the plurality of computing cells is arithmetic-logically reconfigured to perform a second select arithmetic-logic operation by a second configuration signal different than the first configuration signal, the first select operation being different than the second select operation; and a plurality of buses, wherein each of the plurality of computing cells are connectable to at least one of the plurality of computing cells using at least one of the plurality of buses;

wherein each the plurality of computing cells includes associated internal state information, one of the plurality of buses being configured to transfer such internal state information between the plurality of computing cells.

25. The massively parallel data processing apparatus of claim 24, wherein each of the plurality of computing cells maintaining a first configuration for a first period of time.

26. The massively parallel data processing apparatus of claim 25, further comprising:

at least one memory coupled to the processing apparatus for storing at least one of multiple data and processing results.

27. The massively parallel data processing apparatus of claim 25, further comprising:

at least one interface for transferring data coupled to at least one of an external computer and a memory device.

28. The massively parallel data processing apparatus of claim 25, further comprising:

at least one interface coupled to at least one peripheral device.

29. The massively parallel data processing apparatus of claim 25, further comprising:

an interface structure optimized for coupling a plurality of the massively parallel data processing apparatuses.

30. The massively parallel data processing apparatus of claim 25, further comprising:

a compiler capable of reconfiguring each of the plurality of computing cells independently of others of the plurality of computing cells such that portions of the massively parallel data processing apparatus not being reconfigured are not impaired in their operation.

31. The massively parallel data processing apparatus of claim 30, further comprising:

a memory, coupled to the compiler, for storing the first configuration signal and the second configuration signal.

32. The massively parallel data processing apparatus of claim 30, wherein the compiler manages a plurality of configuration programs.

33. The massively parallel data processing apparatus of claim 24, further comprising:

a synchronization circuit providing a plurality of synchronization signals for synchronizing the configuration of the at least some of the plurality of computing cells.

34. The massively parallel data processing apparatus of claim 33, wherein at least one of the plurality of computing cells provides status information to the synchronization circuit.

35. The massively parallel data processing apparatus according to claim 24, wherein each of the computing cells includes a cell configuration memory adapted to store the first configuration signal and the second configuration signal.

36. The massively parallel data processing apparatus according to claim 24, wherein each of the computing cells includes a plurality of logic members selectively coupled together in accordance with the first set of configuration words to arithmetic-logically configure the computing cell and in accordance with the second set of configuration words to arithmetic-logically reconfigure the computing cell.

37. A massively parallel data processing apparatus comprising:

a plurality of computing cells arranged in a multidimensional matrix, each of the plurality of computing cells being arithmetic-logically configurable and reconfigurable, each of the plurality of computing cells capable of processing a first plurality of data words simultaneously with the processing of a second plurality of data words by others of the plurality of computing cells, wherein each of the plurality of computing cells is arithmetic-logically configured by a first configuration signal to perform a first select arithmetic-logic operation, and wherein each of the plurality of computing cells is arithmetic-logically reconfigured to perform a second select arithmetic-logic operation by a second configuration signal different than the first configuration signal, the first select operation being different than the second select operation; and a plurality of buses, wherein each of the plurality of computing cells are connectable to at least one of the plurality of computing cells using at least one of the plurality of buses, wherein each of the plurality of computing cells maintaining a first configuration for a first period of time, and wherein at least some of the plurality of computing cells are capable of detecting a need for a reconfiguration.

38. A massively parallel data processing apparatus, comprising:

a programmable logic device, the programmable logic device including a plurality of logic elements arranged in a multidimensional matrix, each of the plurality of logic elements being arithmetic-logically configurable and reconfigurable, each of the plurality of logic elements capable of processing a first plurality of binary signals simultaneously with the processing of a second plurality of binary signals by others of the plurality of logic units, wherein each of the plurality of logic elements is arithmetic-logically configured to perform a first select arithmetic-logic operation by a first configuration signal, and wherein each of the plurality of logic elements is arithmetic-logically reconfigured to perform a second select arithmetic-logic operation by a second configuration signal different than the first configuration signal, the first select operation being different than the second select operation, the programmable logic device further comprising a plurality of buses, wherein each of the plurality of logic elements are connectable to at least one of the plurality of logic elements using at least one of the plurality of buses; and at least one memory device coupled to the programmable logic device for storing at least one of i) multiple data to be processed by the programmable logic device, and ii) processing results of the programmable logic device;

wherein each the plurality of logic elements includes associated internal state information, one of the plurality of buses being configured to transfer such internal state information between the plurality of logic elements.

39. The massively parallel data processing apparatus of claim 38, wherein each of the plurality of logic elements maintaining a first configuration for a first period of time.

40. The massively parallel data processing apparatus of claim 38, further comprising:

at least one peripheral interface coupled to at least one peripheral device.

41. The massively parallel data processing apparatus of claim 38, further comprising:

an interface structure optimized for coupling a plurality of the massively parallel data processing apparatuses.

42. The massively parallel data processing apparatus of claim 41, wherein at least one of the plurality of logic elements provides status information to the synchronization circuit.

43. The massively parallel data processing apparatus of claim 38, further comprising:

a compiler capable of reconfiguring each of the plurality of logic elements independently of others of the plurality of logic elements such that portions of the massively parallel data processing apparatus not being reconfigured are not impaired in their operation.

44. The massively parallel data processing apparatus of claim 43, further comprising:

a memory, coupled to the compiler, for storing the first configuration signal and the second configuration signal.

45. The massively parallel data processing apparatus of claim 43, wherein the compiler manages a plurality of configuration programs.

46. The massively parallel data processing apparatus of claim 38, further comprising:

a synchronization circuit providing a plurality of synchronization signals for synchronizing the configuration of the at least some of the plurality of computing cells.

47. The massively parallel data processing apparatus of claim 38; further comprising:

at least one of i) an interface coupled to at least one external computer and ii) a further memory device coupled to the at least one external computer, for transferring at least one of multiple data to be processed by the programmable logic device and processing results of the programmable logic device.

48. A massively parallel data processing apparatus comprising:

a programmable logic device, the programmable logic device including a plurality of logic elements arranged in a multidimensional matrix, each of the plurality of logic elements being arithmetic-logically configurable and reconfigurable, each of the plurality of logic elements capable of processing a first plurality of binary signals simultaneously with the processing of a second plurality of binary signals by others of the plurality of logic units, wherein each of the plurality of logic elements is arithmetic-logically configured to perform a first select arithmetic-logic operation by a first configuration signal, and wherein each of the plurality of logic elements is arithmetic-logically reconfigured to perform a second select arithmetic-logic operation by a second configuration signal different than the first configuration signal, the first select operation being different than the second select operation, the programmable logic device further comprising a plurality of buses, wherein each of the plurality of logic elements are connectable to at least one of the plurality of logic elements using at least one of the plurality of buses; and at least one memory device coupled to the programmable logic device for storing at least one of i) multiple data to be processed by the programmable logic device, and ii) processing results of the programmable topic device, wherein each of the plurality of logic elements maintaining a first configuration for a first period of time, and wherein at least some of the plurality of logic elements are capable of detecting a need for a reconfiguration.

49. A data processor, comprising:

cells arranged in a multi-dimensional pattern;

a first compiler for individually accessing and individually configuring at least some of the cells, the first compiler selectively grouping the at least some of the cells with neighboring cells into functional units to perform a first function, the first compiler further selectively regrouping selected ones of the at least some of the cells into different functional units to perform a second function different than the first function while simultaneously others of the at least some of the cells process data;

wherein each the plurality of cells includes associated internal state information, and each of the plurality of cells is configured to transfer such internal state information to at least one other of the plurality of cells.

50. The data processor according to claim 49, wherein the first compiler receives state information from at least one cell in each functional unit and selectively regroups the selected ones of the at least some of the cells as a function of the state information.

51. The data processor according to claim 49, wherein the first compiler selectively regroups the selected one of the at least some of the cells by transmitting configuration data to at least one of the at least some of the cells, the at least one of the at least some of the cells reconfiguring to logically coupled to another of the cells as a function of the configuration data.

52. The data processor according to claim 49, further comprising:

second cells arranged in a second multi-dimensional pattern coupled in cascade with the cells.

53. A data processor comprising:

cells arranged in a multi-dimensional pattern;

a first compiler for individually accessing and individually configuring at least some of the cells, the first compiler selectively grouping the at least some of the cells with neighboring cells into functional units to perform a first function, the first compiler further selectively regrouping selected ones of the at least some of the cells into different functional units to perform a second function different than the first function while simultaneously others of the at least some of the cells process data; and a priority decoder for determining an order for the first compiler to selectively regroup the selected ones of the at least some of the cells.

54. A data processor, comprising:
cells arranged in a multi-dimensional pattern, at least one of the cells being selectively coupled to a first one of the cells to form a first functional unit at a first time, the first functional unit performing a first function, the at least one of the cells capable of being regrouped with a second one of the cells to form a second functional unit at a second time different from the first time, the second functional unit performing a second function different from the first function, the at least one of the cells regrouping as a function of reconfiguration data; and a first compiler receiving state information regarding a state of the first functional unit and transmitting reconfiguration data to the at least one of the cells as a function of the received state information;

wherein the state information includes information associated with an internal condition of the cells, and the state information transferrable between the cells.

55. The data processor according to claim 54, wherein the first compiler determines a program flow as a function of the state information.

56. The data processor according to claim 54, wherein selected ones of the at least one of the cells reconfigure to perform the respective second function while simultaneously others of the at least some of the cells process data.

57. The data processor according to claim 54, further comprising:
a segmented bus selectively coupling each of the cells to others of the cells.

58. The data processor according to claim 54, further comprising:
second cells arranged in a second multi-dimensional pattern coupled in cascade with the cells.

59. A data processor comprising:
cells arranged in a multi-dimensional pattern, at least one of the cells being selectively coupled to a first one of the cells to form a first functional unit at a first time, the first functional unit performing a first function, the at least one of the cells capable of being regrouped with a second one of the cells to form a second functional unit at a second time different from the first time, the second functional unit performing a second function different from the first function, the at least one of the cells regrouping as a function of reconfiguration data;

a first compiler receiving state information regarding the state of the first functional unit and transmitting reconfiguration data to the at least one of the cells as a function of the received state information; and a priority decoder determining an order for the first compiler to transmit the reconfiguration data.

60. A data processor, comprising:
cells arranged in a multi-dimensional pattern, at least one of the cells being selectively coupled to a first one of the cells to form a first functional unit at a first time, the first functional unit performing a first function, the at least one of the cells capable of being regrouped with a second one of the cells to form a second functional unit at a second time different from the first time, the second functional unit performing a second function different from the first function, the at least one of the cells regrouping as a function of reconfiguration data;

a first compiler receiving state information regarding the state of the first functional unit and transmitting reconfiguration data to the at least one of the cells as a function of the received state information;

a segmented bus selectively coupling each of the cells to others of the cells; and wherein the segmented bus including a first segment and a second segment, the first segment providing communication between a first one of the cells and a second one of the cells, the second segment providing communication between a third one of the cells and a fourth one of the cells.

61. A method for configuring a data processor, the data processor including cells arranged in a multi-dimensional pattern, comprising the steps of:
grouping at least some of the cells into functional units;
processing data by the functional units; and
receiving, by a reconfiguration unit, internal state information regarding at least one of the functional units;
wherein the processing of data by the functional units includes transferring state the information regarding at least one of the functional units to another of the functional units.

62. The method according to claim 61, further comprising the step of:
regrouping the at least one of the cells with another of the cells into a different functional unit.

63. The method according to claim 61, wherein the receiving step includes the step of receiving the state information from the at least one of the functional units.

64. The method of configuring a data processor of claim 61, further comprising:
transmitting, by the reconfiguration unit, respective configuration data to the at least one of the functional units as a function of the received state information; and
reconfiguring at least one of the cells in the at least one of the functional units as a function of the respective configuration data while simultaneously other functional units continue processing data.

65. A method for configuring a data processor, the data processor including cells arranged in a multidimensional pattern, comprising the steps of:
individually configuring at least some of the cells to form functional units;
processing data by at least some of the functional units; and
receiving, by a reconfiguration unit, internal state information regarding at least one of the functional units; and
individually reconfiguring at least one cell of at least one of the functional units to form a different functional unit as a function of the state information, while simultaneously others of the functional units continue processing data;
wherein the processing of data by at least some of the functional units includes transferring the state information regarding at least one of the functional units to another of the functional units.

66. The method according to claim 65, further comprising the steps of:
transmitting, by the reconfiguration unit, reconfiguration data to the at least one cell, wherein the step of reconfiguring includes the step of reconfiguring, by the at least one cell, as a function of the reconfiguration data transmitted by the reconfiguration unit.

67. A method for configuring a data processor, the data processor including cells arranged in a multi-dimensional pattern, comprising the steps of:
grouping at least some of the cells into functional units;

enabling by a state machine the at least some of the cells;

after the enabling step, processing data by the functional units;

receiving, by a reconfiguration unit, internal state information regarding at least one of the functional units;

transmitting, by the reconfiguration unit, respective configuration data to the at least one of the functional units as a function of the received state information;

disabling by the state machine at least some of the cells of the at least one of the function units while others of the function units are still enabled; and after the disabling step, reconfiguring at least one of the cells in the at least one of the functional units as a function of the respective configuration data while simultaneously other functional units continue processing data;

wherein the processing of data by the functional units includes transferring the state information regarding at least one of the functional units to another of the functional units.

68. The method according to claim 67, wherein the enabling step includes the step of:

transmitting by the state machine first synchronization signals to the at least some of the cells.

69. The method according to claim 68, wherein the disabling step includes the step of:

transmitting by the state machine second synchronization signals to the at least some of the cells.

70. A method of processing data within a data processor, the data processor including cells arranged in a multi-dimensional pattern, comprising the steps of:

grouping at least some of the cells into functional units;

enabling by a state machine a transfer of data between a first plurality of the cells depending on the presence of the data and a state of at least some of the cells, the first plurality of the cells being in a READY state for at least one of i) accepting new data, and ii) transmitting a result; and disabling by a state machine the transfer of the data depending on the presence of the data and the state of at least some of the cells, the at least some of the cells being in a NOT ready state for accepting the new data and for transmitting the results.

71. A method for configuring a data processor, the data processor including cells arranged in a multi-dimensional pattern, comprising the steps of:

grouping at least some of the cells into functional units;

enabling by a state machine the at least some of the cells;

after the enabling step, processing data by the functional units;

receiving, by a reconfiguration unit, internal state information regarding at least one of the functional units;

disabling by the state machine at least some of the cells of the at least one of the function units while others of the function units are still enabled;

transmitting, by the reconfiguration unit, respective configuration data to the at least one of the functional units as a function of the received state information; and after the disabling step, reconfiguring at least one of the cells in the at least one of the functional units as a function of the respective configuration data while simultaneously other functional units continue processing data;

wherein the processing of data by at least some of the functional units includes transferring the state information regarding at least one of the functional units to another of the functional units.

72. A massively parallel data processing apparatus comprising:

a plurality of computing cells arranged in a multidimensional matrix, the plurality of computing cells capable of simultaneously manipulating a plurality of data, each of the plurality of computing cells including:

an input interface for receiving a plurality of input signals, a plurality of logic members, at least one of the plurality of logic members coupled to the input interface, at least one coupling unit selectively coupling at least one of the plurality of logic members to another of the plurality of logic members a function of at least one of a plurality of configuration signals, a cell configuration memory adapted to store the at least one of the plurality of configuration signals, a register unit selectively storing a portion of the processed input signals, and an output interface for transmitting the processed input signals, wherein the input interface of at least one of the plurality of computing cells is selectively coupled to the output interface of at least another of the plurality of computing cells; and a configuration interface for transmitting the plurality of configuration signals to at least some of the plurality of computing cells to arithmetic-logically configure and arithmetic-logically reconfigure the at least some of the plurality of computing cells;

wherein each the plurality of computing cells includes associated internal state information, each of the plurality of computing cells being configured to enable transfer of the state information to at least one other of the plurality of computing cells.

* * * * *

UNITED STATES PATENT AND TRADEMARK OFFICE
CERTIFICATE OF CORRECTION

PATENT NO. : 6,859,869 B1  Page 1 of 1
APPLICATION NO. : 09/290342
DATED : February 22, 2005
INVENTOR(S) : Vorbach et al.

It is certified that error appears in the above-identified patent and that said Letters Patent is hereby corrected as shown below:

Column 2, line 41, change "Correspond" to -- correspond --;

Column 5, line 24, change "symibolically" to -- symbolically --;

Column 9, line 60, change "Asimple" to -- A simple --;

Column 13, line 39, change "arithmetic-lopically" to -- arithmetic-logically --; and Column 14, line 48, change "arithmetic-lopically" to -- arithmetic-logically --.

Signed and Sealed this

Eleventh Day of March, 2008

JON W. DUDAS
*Director of the United States Patent and Trademark Office*